US010790768B2

(12) United States Patent
Hijikata

(10) Patent No.: US 10,790,768 B2
(45) Date of Patent: Sep. 29, 2020

(54) MOTOR DRIVING CONTROL DEVICE AND MOTOR DRIVING CONTROL METHOD

(71) Applicant: MINEBEA MITSUMI Inc., Nagano (JP)

(72) Inventor: Hidetoshi Hijikata, Hamamatsu (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/282,518

(22) Filed: Feb. 22, 2019

(65) Prior Publication Data

US 2019/0190415 A1   Jun. 20, 2019

Related U.S. Application Data

(63) Continuation of application No. PCT/JP2017/028892, filed on Aug. 9, 2017.

(30) Foreign Application Priority Data

Sep. 1, 2016   (JP) .................................. 2016-171243

(51) Int. Cl.
*H02K 17/32* (2006.01)
*H02P 6/24* (2006.01)
(Continued)

(52) U.S. Cl.
CPC ................ *H02P 6/24* (2013.01); *H02P 6/182* (2013.01); *H02P 8/14* (2013.01); *H02P 8/24* (2013.01)

(58) Field of Classification Search
CPC .... H02P 6/182; H02P 6/24; H02P 8/14; H02P 8/24
See application file for complete search history.

(56) References Cited

U.S. PATENT DOCUMENTS

| 5,793,168 A | 8/1998 | Vitunic |
| 2011/0156624 A1 | 6/2011 | Takai |

(Continued)

FOREIGN PATENT DOCUMENTS

| JP | 2005-229743 A | 8/2005 |
| JP | 2011-139582 A | 7/2011 |
| JP | 2013-102656 A | 5/2013 |

OTHER PUBLICATIONS

International Search Report for corresponding International Application No. PCT/JP2017/028892 dated Oct. 31, 2017.

(Continued)

*Primary Examiner* — Karen Masih
(74) *Attorney, Agent, or Firm* — Pearne & Gordon LLP

(57) ABSTRACT

A rotational stop position of a motor is accurately controlled. A motor driving control device (100) includes a BEMF detection unit (118) for detecting zero-cross of back electromotive force of a motor coil provided in a motor, and a CPU (101) for controlling driving of the motor by a 1-phase energization method and, without a position sensor, performing commutation based on the zero-cross of the back electromotive force detected by the BEMF detection unit (118), controlling driving of the motor based on a rotational speed corresponding to a drive voltage and a load, and performing extension control of a commutation time for each step from a calculated deceleration start step until the rotational speed of the motor decreases to a predetermined rotational speed or less for enabling the motor to stop at a desired stop position when the driving of the motor is stopped.

8 Claims, 14 Drawing Sheets

(51) Int. Cl.
    *H02P 8/24*    (2006.01)
    *H02P 6/182*   (2016.01)
    *H02P 8/14*    (2006.01)

(56)            References Cited

U.S. PATENT DOCUMENTS

2012/0098473 A1    4/2012   Nachev et al.
2014/0217939 A1    8/2014   Lee
2018/0123489 A1*   5/2018   Zhou ...................... H02P 6/182

OTHER PUBLICATIONS

Written Opinion for corresponding International Application No. PCT/JP2017/028892 dated Oct. 31, 2017.
English translation of Written Opinion for corresponding International Application No. PCT/JP2017/028892 dated Oct. 31, 2017.
International Preliminary Report on Patentability for corresponding International Application No. PCT/JP2017/028892 dated Mar. 5, 2019.
Notification of Reasons for Refusal dated May 7, 2019 for corresponding Japanese Application No. 2016-171243 and English translation.

* cited by examiner

MOTOR DRIVING CONTROL DEVICE AND MOTOR DRIVING CONTROL METHOD

CROSS REFERENCE TO RELATED APPLICATIONS

The present application is a continuation application of International Patent Application No. PCT/JP2017/028892 filed on Aug. 9, 2017, which claims the benefit of Japanese Patent Application No. 2016-171243, filed on Sep. 1, 2016. The contents of these applications are incorporated herein by reference in their entirety.

BACKGROUND

Technical Field

The present disclosure relates to a motor driving control device and a motor driving control method suitable for controlling a rotational stop position of a motor.

Background

Conventionally, when a stepping motor is subjected to position sensorless driving for performing commutation with the zero-cross of back electromotive force set as a trigger under 1-phase excitation, the motor rotates with a load current and a rotational speed corresponding to a drive voltage and a load. When driving of this motor is stopped, overrun occurs due to the inertia of the motor and positional accuracy of the rotational stop position of the motor is deteriorated.

When all switching elements (FETs) of a driving circuit (H-bridge circuit) are turned off to stop the motor, the back electromotive force periodically changes with stoppage of the motor, and it is observed that the motor is rotating with the inertia of the motor.

In a hold current decay control method for performing control to stop the motor so as to set a hold current to a high current under 2-phase excitation simultaneously with stoppage of the motor, gradually decrease the current and stop the decrease of the current at a stable point of the 2-phase excitation, when the rotational speed of the motor is low and thus the inertia is small, it is possible to secure positional accuracy. However, when the rotational speed of the motor is high and thus the inertia is large, the current periodically changes with stoppage of the motor during the control to stop the motor, and it can be observed that the motor is rotating with the inertia of the motor.

For this reason, when an excessive current occurs during the foregoing hold current decay control to stop the motor, it is more possible to secure positional accuracy by using fast decay control for applying a voltage in a reverse direction so as to consume the current as compared with the hold current decay control, but it is impossible to secure positional accuracy in the case of the inertia of a motor exceeding one quadrant of an electrical angle.

For example, a control method for a stepping motor capable of accurately controlling the stop position of a rotor even when the rotational speed is high is disclosed in Japanese Patent Application Laid-Open No. 2005-229743.

The control method of Japanese Patent Application Laid-Open No. 2005-229743 is open control of 1-phase excitation, and the rotational speed just before the stop is arbitrary but fixed. The open control of 1-phase excitation cannot achieve an optimum rotational speed corresponding to a load, and a time in which vibration of the motor has subsided varies according to the load. Since the rotational speed just before the stop of the motor is not stabilized due to the drive voltage or the load, the position sensorless driving may have a risk such that it is difficult to accurately control the rotational stop position due to occurrence of overrun caused by the inertia, etc. when a holding time is extended in one step just before the stop. That is, it is insufficient to control the rotational stop position of the motor to a desired stop position in a short period of time under some rotational states.

Therefore, the present disclosure is related to providing a motor driving control device and a motor driving control method capable of accurately controlling a rotational stop position of a motor in a short time.

SUMMARY

According to a first aspect of the present disclosure, a motor driving control device comprises a zero-cross detection unit configured to detect zero-cross of back electromotive force of a motor coil provided in a motor, and a control unit configured to control driving of the motor by a 1-phase excitation method and without a position sensor perform commutation based on the zero-cross of the back electromotive force detected by the zero-cross detection unit, control driving of the motor based on a rotational speed corresponding to a drive voltage and a load, and perform extension control of a commutation time for each step from a calculated deceleration start step until the rotational speed of the motor decreases to a predetermined rotational speed or less for enabling the motor to stop at a desired stop position when the driving of the motor is stopped.

Other units will be described in the detailed description of embodiments.

According to the present disclosure, with respect to the motor driving control device and the motor driving control method, the rotational stop position of the motor can be accurately controlled in a short time.

DETAILED DESCRIPTION

An embodiment for implementing the present disclosure will be described hereinafter in detail with reference to the drawings.

Figure 1:
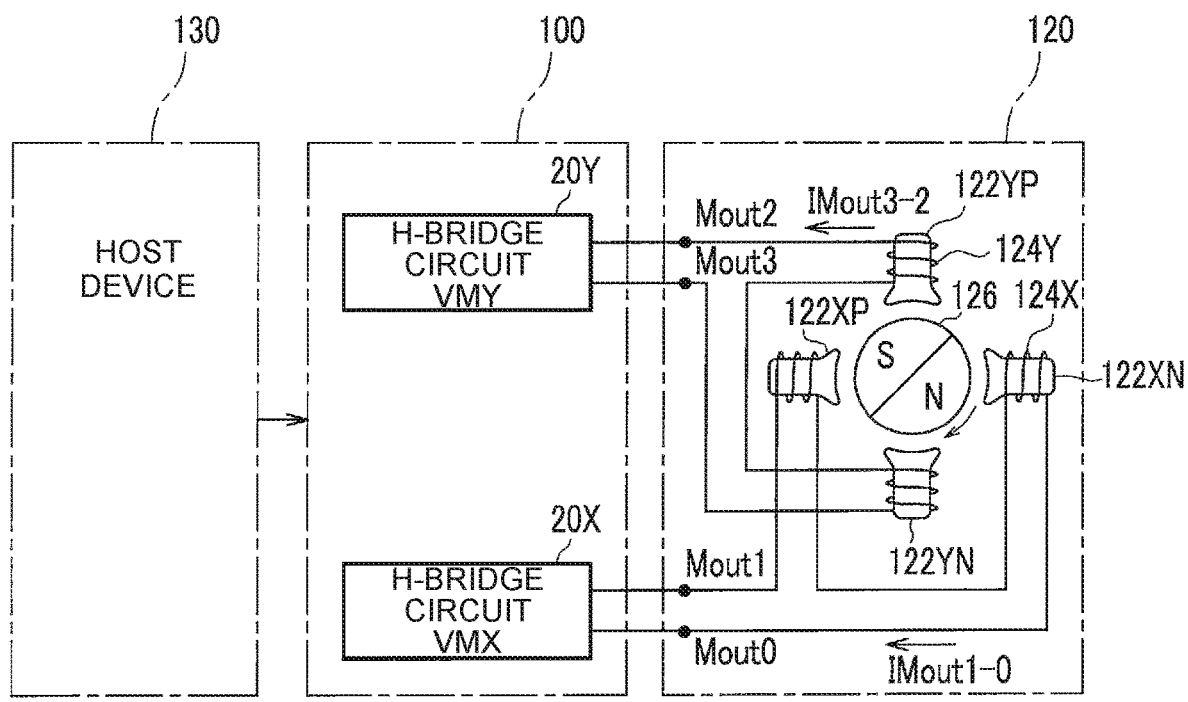
FIG. 1 is an overall block diagram of a motor control system according to the present embodiment and a comparative example.

FIG. 1 is an overall block diagram of a motor control system according to the present embodiment and a comparative example.

In FIG. 1, a stepping motor 120 is a bipolar type two-phase stepping motor, and includes a rotor 126 having a permanent magnet and being provided rotatably and stators provided at positions quadrisectioned in a circumferential direction around the rotor 126. These stators include stators 122XP and 122XN of the X-phase, and stators 122YP and 122YN of the Y-phase. A winding is wound around each of these stators. The windings wound around the stators 122YP and 122YN are connected to each other in series, and the combination of both the windings is referred to as a "stator winding 124Y". Likewise, the windings wound around the stators 122XP and 122XN are connected to each other in series, and the combination of both the windings is referred to as a "stator winding 124X". The stator windings 124Y and 124X are examples of motor coils.

A host device 130 outputs a speed command signal for commanding the rotational speed of the stepping motor 120. A motor driving control device 100 controls driving of the stepping motor 120 according to the speed command signal. H-bridge circuits 20X and 20Y each including a combination of half bridges connected to the stator windings are provided to the motor driving control device 100, and apply an X-phase voltage VMX and a Y-phase voltage VMY to the stator windings 124X and 124Y, respectively.

The H-bridge circuit 20X is connected to the winding (an example of the motor coil) of the X-phase stator 122XN via a connection point Mout0, and further connected to the winding (an example of the motor coil) of the X-phase stator 122XP via a connection point Mout1. A coil current IMout1-0 is a current flowing from the connection point Mout1 to the connection point Mout0.

The H-bridge circuit 20Y is connected to the winding (an example of the motor coil) of the Y-phase stator 122YP via a connection point Mout2, and further connected to the winding (an example of the motor coil) of the Y-phase stator 122YN via a connection point Mout3. A coil current IMout3-2 is a current flowing from the connection point Mout3 to the connection point Mout2.

(Motor Driving Control Device 100)

Figure 2:
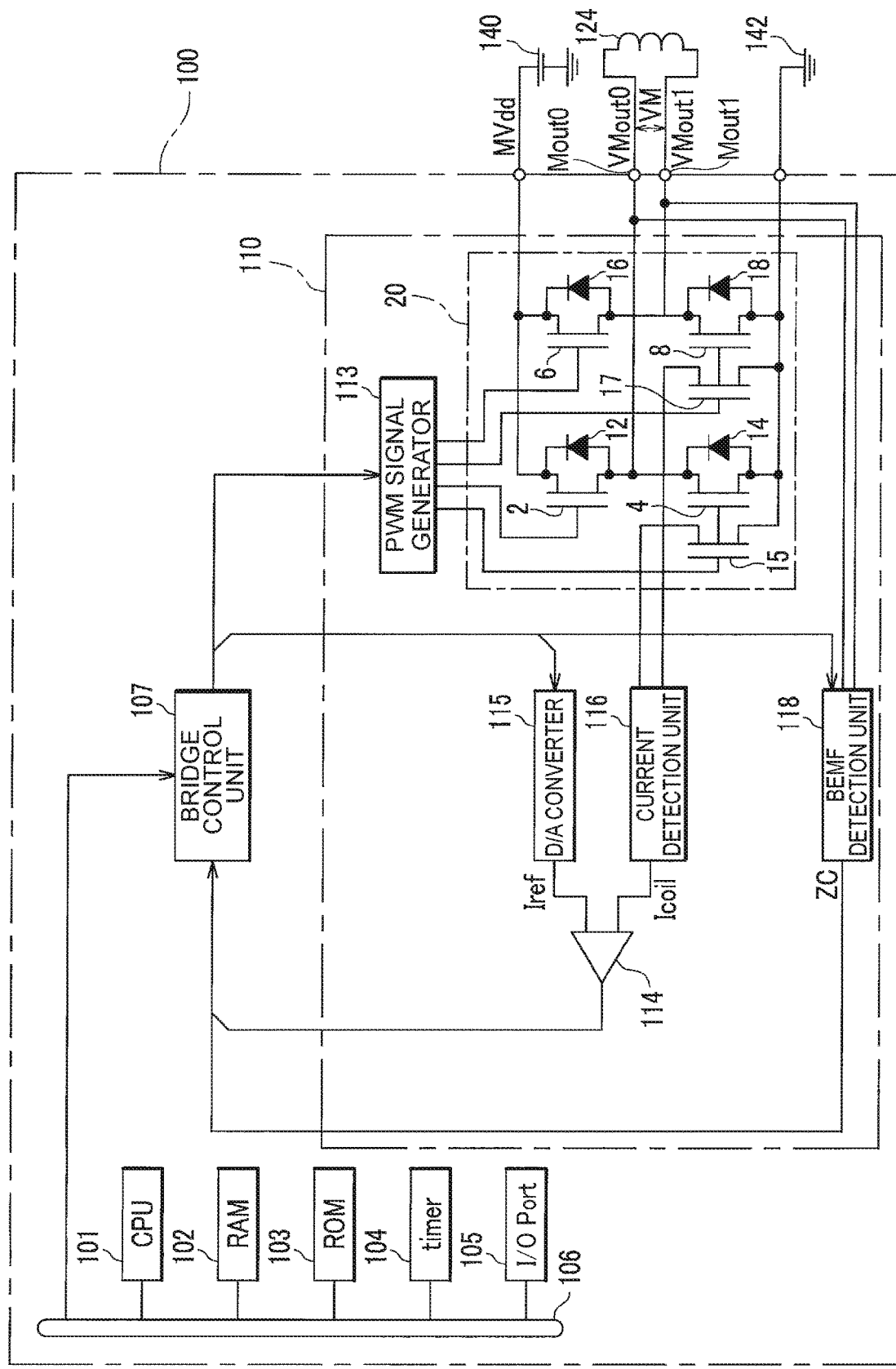
FIG. 2 is a detailed block diagram of a motor driving control device according to the present embodiment and the comparative example.

Thereafter, the motor driving control device 100 will be described in detail with reference to FIG. 2. The stator windings 124X and 124Y of two systems and H-bridge circuits 20X and 20Y of the two systems are shown in FIG. 1. However, these stator windings and these H-bridge circuits are collectively shown as a stator winding 124 of one system and an H-bridge circuit 20 of one system.

A CPU (Central Processing Unit) 101 (an example of a control unit) provided inside the motor driving control device 100 controls each unit via a bus 106 based on a control program stored in ROM (Read Only Memory) 103. RAM (Random Access Memory) 102 is used as a work memory of the CPU 101. A timer 104 measures elapsed time from a reset timing under the control of the CPU 101. An I/O port 105 receives and outputs signals to and from the host device 130 and other external devices shown in FIG. 1. A bridge control unit 107 controls each unit of a bridge control circuit 110 based on a command from the CPU 101.

Here, the bridge control circuit 110 is formed as an integral integrated circuit. In the bridge control circuit 110, a PWM (pulse width modulation) signal generator 113 generates a PWM signal and supplies the PWM signal to the H-bridge circuit 20 under the control of the bridge control unit 107. FETs (Field-Effect Transistors) 2, 4, 6, and 8 and FETs 15 and 17 are included in the H-bridge circuit 20. In FIG. 2, terminals on the lower side of these FETs are source terminals, and terminals on the upper side of these FETs are drain terminals. The PWM signal is an ON/OFF signal to be applied as a gate voltage to these FETs.

The FETs 2 and 4 are connected to each other in series, a DC power source 140 and a ground line 142 are connected to this series circuit, and a predetermined voltage MVdd is applied to the series circuit. Likewise, the FETs 6 and 8 are also connected to each other in series, and the voltage MVdd is also applied to the series circuit. Diodes 12, 14, 16, and 18 are parasitic diodes for reflux, and are connected in parallel to the FETs 2, 4, 6, and 8. The FETs 15 and 17 are provided for current detection and form current mirror circuits together with the FETs 4 and 8, respectively. As a result, currents proportional to currents flowing through the FETs 4 and 8 flow through the FETs 15 and 17, respectively.

The voltage VMout0 at the connection point Mout0 of the FETs 2 and 4 is applied to one end of the stator winding 124 of the motor. The voltage VMout1 at the connection point Mout1 of the FETs 6 and 8 is applied to another end of the stator winding 124. Therefore, a motor voltage VM corresponding to the difference between the voltage VMout0 and the voltage VMout1 is applied to the stator winding 124. Actually, the motor voltage VM is the X-phase voltage VMX and the Y-phase voltage VMY shown in FIG. 1.

A current detection unit 116 (an example of a current detection unit) detects the motor current flowing through the stator winding. More specifically, the current detection unit 116 measures current values flowing through the FETs 15 and 17 according to the current direction, thereby outputting a current measurement value Icoil of a current flowing through the stator winding 124. A D/A converter 115 receives a digital value of a current reference value Iref from the bridge control unit 107, and converts the digital value to an analog value. A comparator 114 compares a current measurement value Icoil of the analog value with the current reference value Iref, outputs a "1" signal when the former is equal to or larger than the latter, and outputs a "0" signal in other cases.

Furthermore, the voltages VMout0 and VMout1 are also supplied to a BEMF (back electromotive force) detection unit 118 (an example of a zero-cross detection unit). The BEMF detection unit 118 detects zero-cross of back electromotive force of the stator windings 124Y and 124X provided in the stator of the stepping motor 120. That is, when the motor voltage VM is back electromotive force, the BEMF detection unit 118 outputs a flag ZC according to switching (zero-cross) in the voltage direction during a period when no voltage is applied from the H-bridge circuit 20.

The CPU 101 controls the driving of the stepping motor 120 by a 1-phase excitation method and without a position sensor, performs commutation based on the zero-cross of the back electromotive force detected by the BEMF detection unit 118, and performs the control of the driving of the stepping motor 120 at a rotational speed corresponding to the drive voltage and the load. In addition, as described later, when stopping the driving of the stepping motor 120, the CPU 101 controls extension of a commutation time for each step from a calculated deceleration start step until the rotational speed of the stepping motor 120 decreases to a predetermined rotational speed or less. At the predetermined rotational speed or less, the stepping motor 120 can stop at a desired stop position.

(Operation Mode of H-Bridge Circuit 20)

FIGS. 3A to 3D and FIGS. 4E and 4F are explanatory diagrams of operation modes of the H-bridge circuit. The operation modes of the H-bridge circuit 20 will be described with reference to these explanatory diagrams.

Figure 3A:
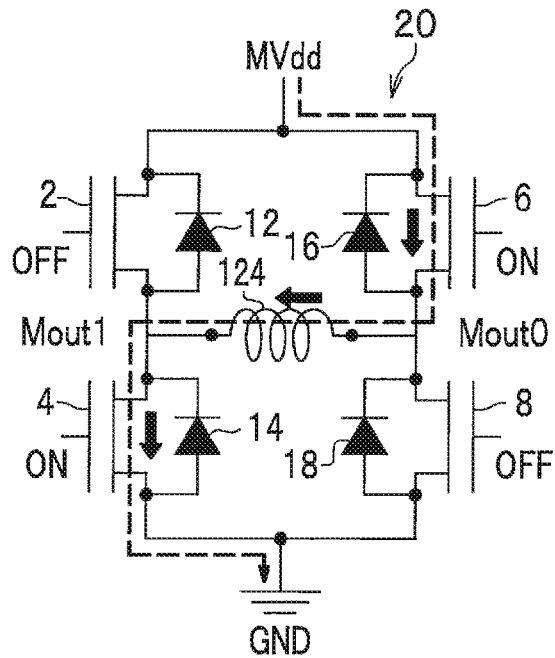
FIGS. 3A to 3D are first explanatory diagrams of an operation mode of an H-bridge circuit.

FIG. 3A shows a case where two diagonally opposite FETs are set to an ON state to increase the absolute value of a motor current flowing through the stator winding 124. In the example shown in FIG. 3A, the FETs 4 and 6 are in the ON state while the FETs 2 and 8 are in an OFF state. In FIG. 3A, an increase of the absolute value of the motor current is indicated by black arrows. In this state, the motor current flows in a direction indicated by a broken line via the FET6→the stator winding 124→the FET 4, and the motor current increases. This operation mode is called a charge mode.

Figure 3B:
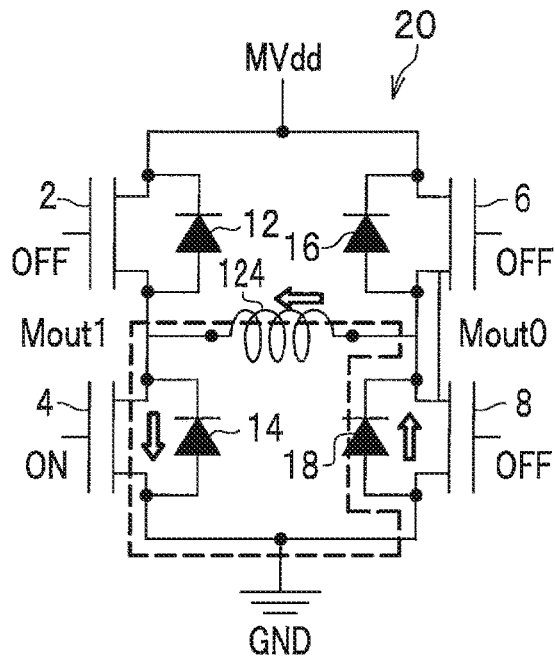

Furthermore, when the current is slowly decayed from the state of FIG. 3A, the FET 6 is turned off as shown in FIG. 3B. The FET 4 maintains the ON state, and the FETs 2 and 8 maintain the OFF state. Then, a current looping through the FET 4, the diode 18 (the parasitic diode of the FET 8) and the stator winding 124 flows as indicated by a broken line in the figures. This current is decayed by the FET 4, the diode 18 (the parasitic diode of the FET 8) and the impedance of the stator winding 124, but the decay speed is low. This operation mode is called an asynchronous slow decay mode. In FIG. 3B, decay of the motor current is indicated by outlined arrows.

Figure 3C:
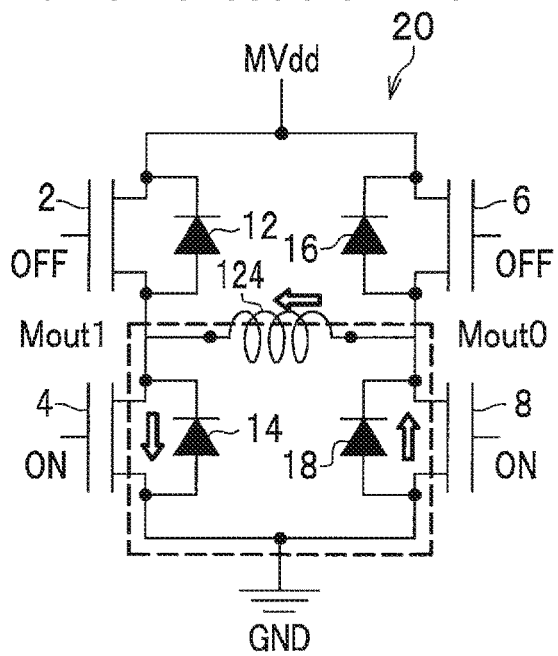

Furthermore, as a variation of the slow decay mode, as shown in FIG. 3C, the FET 8 may be further turned on. At this time, a motor current looping through the FETs 4 and 8 and the stator winding 124 flows as indicated by broken lines in the figures. This current is decayed by the FETs 4 and 8 and the impedance of the stator winding 124, but the decay speed is lower. This operation mode is referred to as a synchronous slow decay mode. In FIG. 3C, decay of the motor current is indicated by outlined arrows.

Even when the gate voltage of any one FET is set to OFF, the FET is kept in the ON state for a period of time due to the parasitic capacitance of the FET. For this reason, for example, when a state in which the FET 4 is turned on and the FET 2 is turned off is instantaneously switched to a state in which the FET 4 is turned off and the FET 2 is turned on, the FETs 2 and 4 connected in series are instantaneously set to the ON state, so that the voltage MVdd and the ground are short-circuited with relation to each other and thus the FETs 2 and 4 are destroyed. In order to protect such a situation, the H-bridge circuit 20 is set to a shoot through protection mode as shown in FIG. 3D.

Figure 3D:
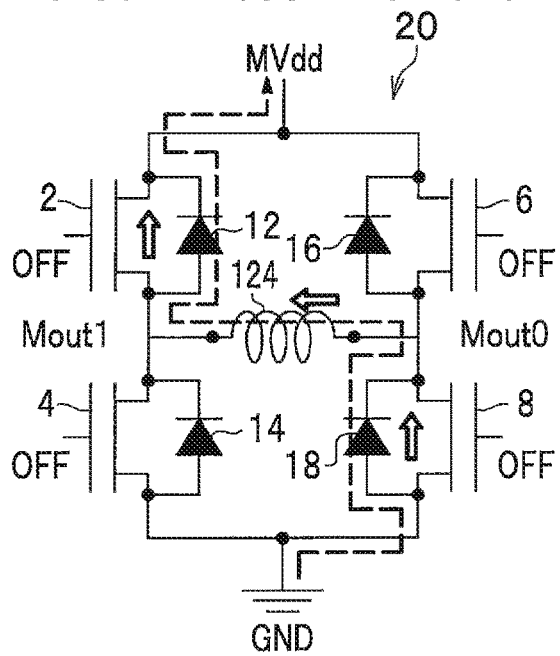

FIG. 3D shows the shoot through protection mode. In the shoot through protection mode, the FETs 2, 4, 6, and 8 are set to the OFF state. When the charge mode of FIG. 3A is switched to the shoot through protection mode of FIG. 3D, back electromotive force occurs in the stator winding 124. Therefore, the motor current flows through the diode 18→the stator winding 124→the diode 12 (the parasitic diode of the FET 2) in a direction indicated by a broken line.

In the shoot through protection mode of FIG. 3D, a power dissipation corresponding to a forward voltage drop of the diodes 12 and 18 occurs, so that the decay speed of the motor current becomes largest.

Figure 4E:
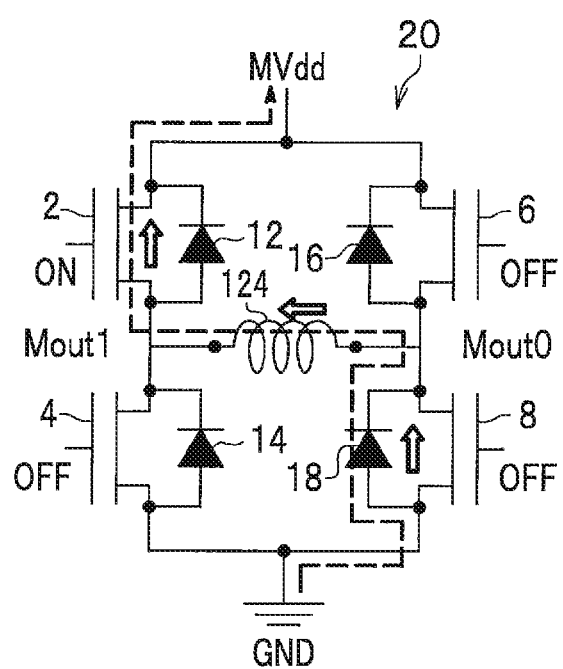
FIGS. 4E and 4F are second explanatory diagrams of the operation mode of the H-bridge circuit.

Here, when the FET 2 is turned on, the mode transits to a flyback mode shown in FIG. 4E. The flyback mode is a mode in which the motor current flows through the diode 18→the stator winding 124→the FET 2 in a direction indicated by a broken line. In the flyback mode, the decay speed of the motor current becomes slightly more gradual than that in the shoot through protection mode.

Figure 4F:
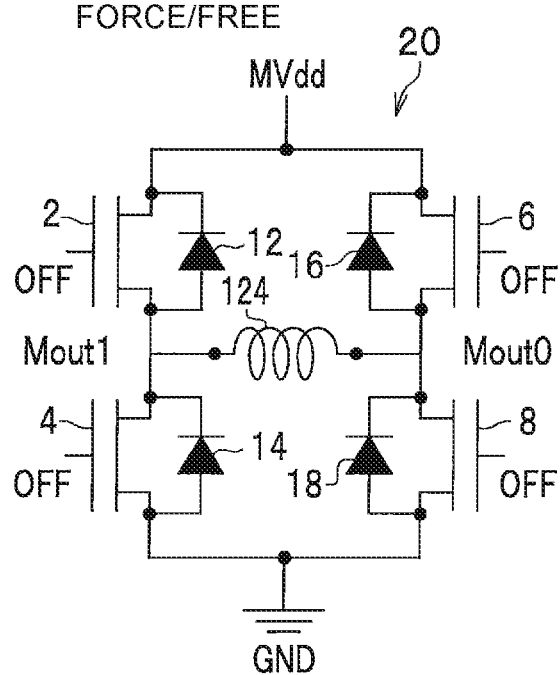

When all energy charged in the stator winding 124 in the flyback mode is released and then the FET 2 is turned off, the mode transits to a back electromotive force/free mode shown in FIG. 4F.

The back electromotive force mode is a mode in which the FETs 2, 4, 6, and 8 are set to the OFF state, no current flows in the H-bridge circuit 20, and back electromotive force occurs. The free mode is a mode after the FETs 2, 4, 6, and 8 are set to the OFF state, no current flows in the H-bridge circuit 20, and back electromotive force crosses zero.

Figure 6:
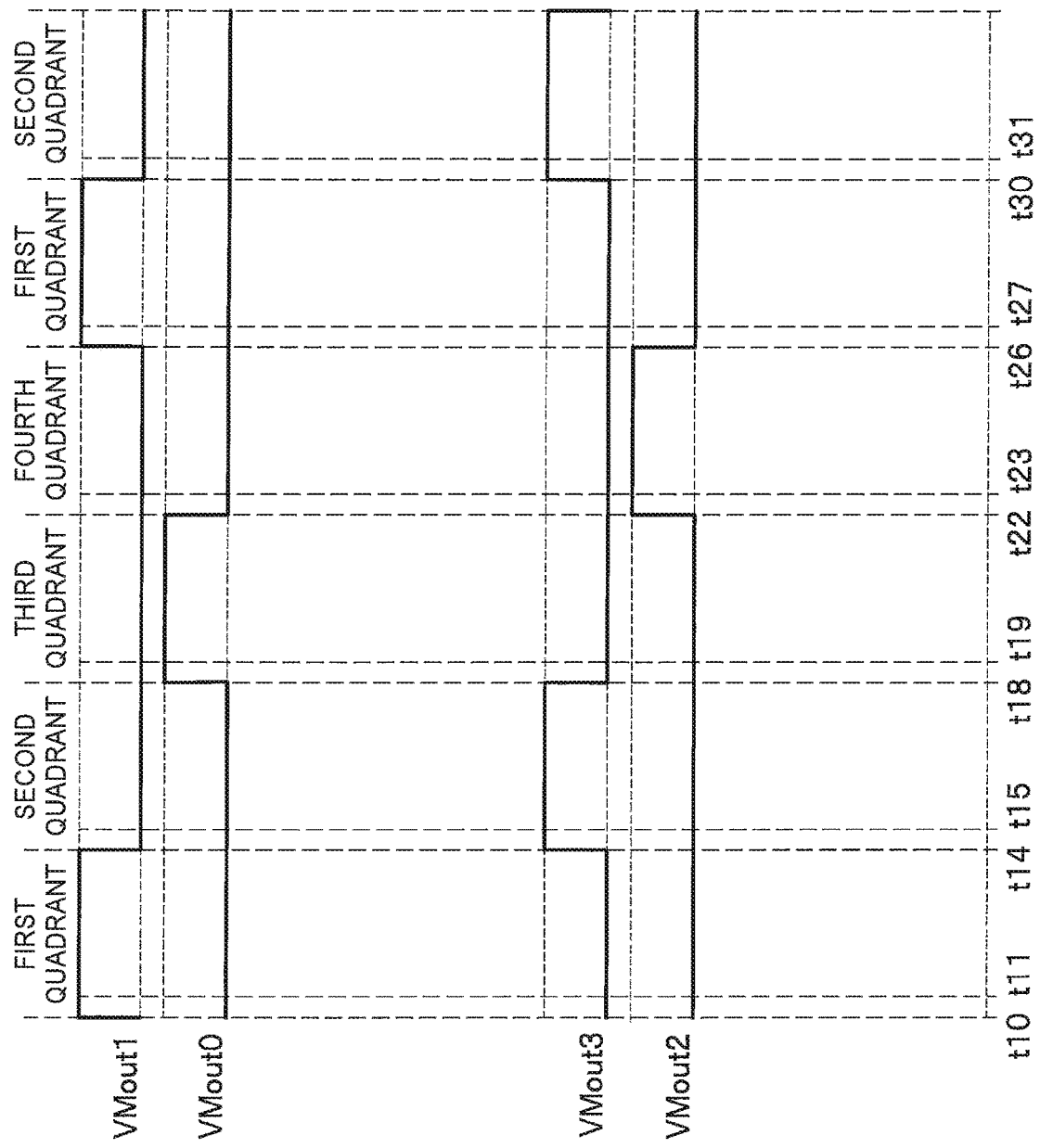
FIG. 6 is a waveform diagram illustrating a commutation order of the H-bridge circuit of the comparative example.

The 1-phase excitation driving of the two-phase stepping motor performs commutation in the order of X+ phase→Y+ phase→X− phase→Y− phase to sequentially shift from the first quadrant to the fourth quadrant as shown in FIG. 6 below, thereby energizing the coils phase by phase. When the stepping motor 120 is rotated in the reverse direction, the commutation is performed in the order of X+ phase→Y− phase→X− phase→Y+ phase.

In a normal case where the coil current is within a maximum current, the H-bridge circuit 20 transits in the order of the charge mode→the shoot through protection mode→the flyback mode→the free mode.

The CPU 101 repeats the charge mode and the slow decay mode as the operation mode under current limitation of the H-bridge circuit 20. Furthermore, as the operation mode under current limitation of the H-bridge circuit 20, the CPU 101 causes the H-bridge circuit 20 to transit in the order of the shoot through protection mode, the flyback mode, and the free mode after repetition of the charge mode and the slow decay mode at every PWM cycle.

That is, under current limitation, the H-bridge circuit 20 repeats the charge mode and the slow decay mode at every PWM cycle, and then transits in the order of the shoot through protection mode the flyback mode the free mode. By using the slow decay mode, the decay of current becomes smaller than that in the fast decay mode. Therefore, the rotational driving force and the holding force of the motor are maintained, and a current ripple caused by the repetition of the charge mode and the slow decay mode is reduced.

The slow decay mode is available in a case in which the processing is performed by an asynchronous slow decay mode alone and a case in which the mode is shifted to a synchronous slow decay mode after the asynchronous slow decay mode.

The flyback mode is available in a case in which a kickback voltage is regenerated to a power source via a parasitic diode (shoot through protection mode) and a case where the FET on an upper side (a high side) of this route is turned on for regeneration to the power source (flyback mode).

Figure 5:
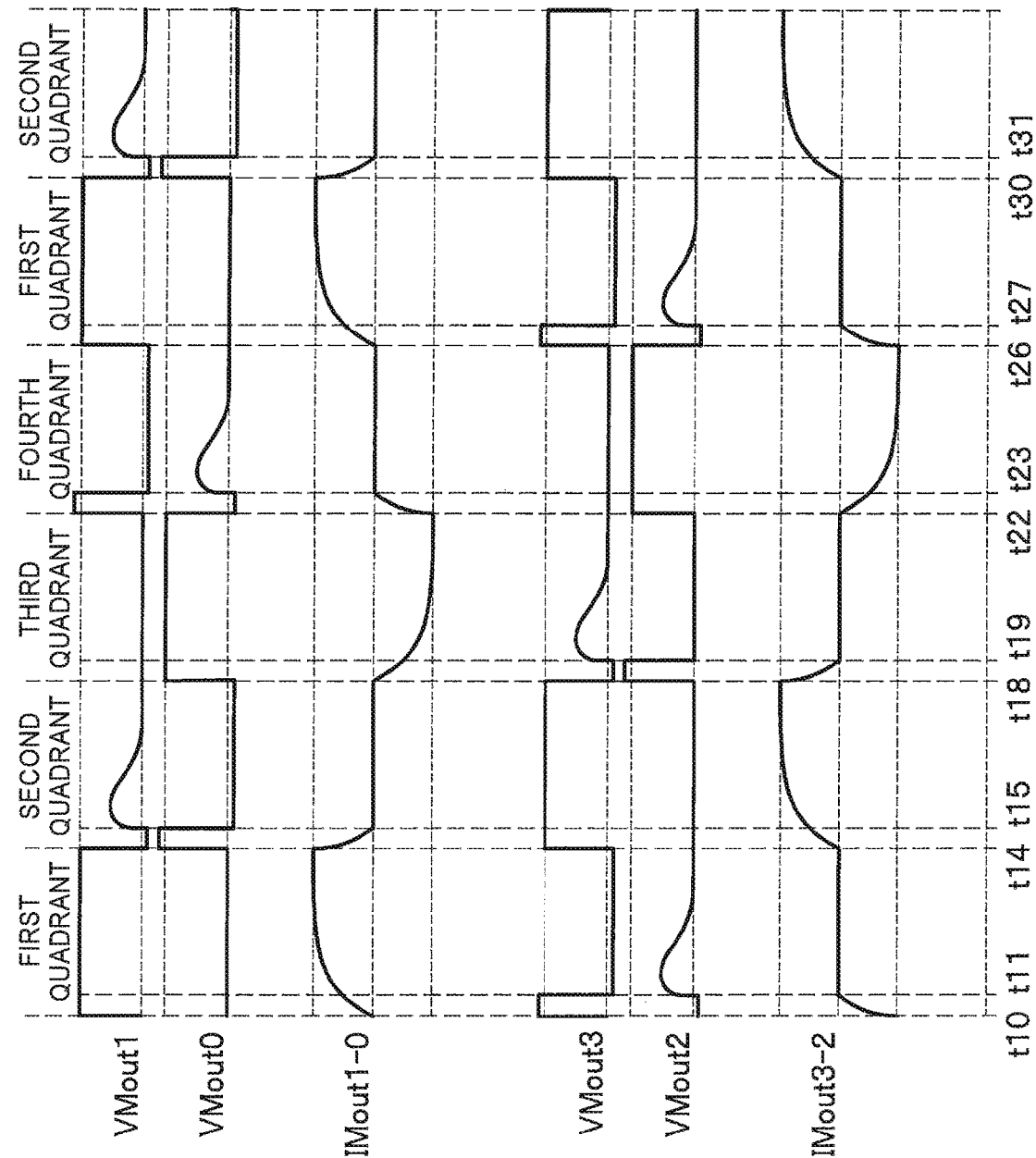
FIG. 5 is a waveform diagram illustrating currents/voltages of X-phase and Y-phase of an H-bridge circuit of a comparative example.

FIG. 5 is a waveform diagram illustrating the currents/ voltages of the X-phase and the Y-phase of the H-bridge circuit 20 of a comparative example. FIG. 6 is a waveform diagram illustrating the commutation order of the H-bridge circuit 20 of the comparative example. Hereinafter, the operation in each quadrant will be described with reference to FIGS. 5 and 6.

<<First Quadrant: Time t10>>

At a time t10 in the first quadrant, the H-bridge circuit 20X of the X-phase shifts to the charge mode, and the H-bridge circuit 20Y of the Y-phase shifts to the flyback mode. As shown in FIG. 6, the stepping motor 120 is in the X+ phase, and the voltage VMout1 becomes the voltage MVdd.

In the H-bridge circuit 20X of the X-phase, in the charge mode, the voltage VMout1 is switched to the voltage MVdd, and the voltage VMout0 is switched to GND (ground) as shown in FIG. 5. The voltage MVdd is applied to the X-phase stator winding 124X, and the X-phase coil current IMout1-0 gradually increases.

When the absolute value of the X-phase coil current IMout1-0 exceeds a predetermined maximum current, the H-bridge circuit 20X switches from the charge mode to the slow decay mode at every PWM cycle, whereby the absolute value of the coil current IMout1-0 is maintained at less than the maximum current.

A flyback pulse (kickback) occurring in an opposite direction to the direction of a voltage applied in an immediately preceding fourth quadrant occurs in the H-bridge circuit 20Y of the Y-phase. The H-bridge circuit 20Y shifts to the free mode when the flyback voltage falls and further the coil current IMout3-2 is equal to 0. The H-bridge circuit 20Y shifts to the free mode at a time t11.

In the free mode, back electromotive force appears in a direction opposite to that of the kickback in the H-bridge circuit 20Y of the Y-phase. The CPU 101 performs commutation with the zero-cross of this back electromotive force voltage set as a trigger, and shifts to a next second quadrant. The occurrence time of the kickback and the back electromotive force vary according to the drive voltage of the motor, the driving load of the motor, and the rotational speed.

Note that the shoot through protection mode is inserted between the respective modes as required so that the upper and lower FETs of the half bridge are not turned on at the same time. As a result, through-current can be prevented.

<<Second Quadrant: Time t14>>

At a time t14 in the second quadrant, the H-bridge circuit 20X of the X-phase shifts to the flyback mode, and the H-bridge circuit 20Y of the Y-phase shifts to the charge mode. As shown in FIG. 6, the stepping motor 120 is in the Y+ phase, and the voltage VMout3 becomes the voltage MVdd.

As shown in FIG. 5, a flyback pulse (kickback) occurring in a direction opposite to the direction of a voltage applied in an immediately preceding first quadrant occurs in the H-bridge circuit 20X of the X-phase. The H-bridge circuit 20X shifts to the free mode when the flyback voltage falls and further the coil current IMout1-0 is equal to 0. The H-bridge circuit 20X shifts to the free mode at a time t15.

In the free mode, back electromotive force appears in an opposite direction to that of the kickback in the H-bridge circuit 20X of the X-phase. The CPU 101 performs commutation with the zero-cross of this back electromotive force set as a trigger, and shifts to a next third quadrant. The occurrence time of the kickback and the back electromotive force vary according to the drive voltage of the motor, the driving load of the motor, and the rotational speed.

Note that the shoot through protection mode is inserted between the respective modes as required so that the upper and lower FETs of the half bridge are not turned on at the same time. As a result, through-current can be prevented.

In the charge mode, the voltage VMout3 is switched to the voltage MVdd and the voltage VMout2 is switched to the GND in the H-bridge circuit 20Y of the Y-phase. The voltage MVdd is applied to the Y-phase stator winding 124Y, and the Y-phase coil current IMout3-2 gradually increases.

When the absolute value of the Y-phase coil current IMout3-2 exceeds a predetermined maximum current, the H-bridge circuit 20Y switches from the charge mode to the slow decay mode at every PWM cycle, whereby the absolute value of the coil current IMout3-2 is maintained at less than the maximum current.

<<Third Quadrant: Time t18>>

At a time t18 in the third quadrant, the H-bridge circuit 20X of the X-phase shifts to the charge mode. In the charge mode, the coil current IMout1-0 flows in an opposite direction to that in the first quadrant. The H-bridge circuit 20Y of the Y-phase shifts to the flyback mode. In the flyback mode, the coil current IMout3-2 flows in an opposite direction to that in the first quadrant. As shown in FIG. 6, the stepping motor 120 is in the X− phase, and the voltage VMout0 becomes the voltage MVdd.

As shown in FIG. 5, in the H-bridge circuit 20X of the X-phase, the voltage VMout1 is switched to GND, and the voltage VMout0 is switched to the voltage MVdd. A voltage is applied to the X-phase stator winding 124X in a direction opposite to that in the first quadrant so that the X-phase coil current IMout1-0 gradually increases in the direction opposite to that in the first quadrant.

A flyback pulse (kickback) occurring in a direction opposite to the direction of a voltage applied in an immediately preceding second quadrant occurs in the H-bridge circuit 20Y of the Y-phase. When the flyback voltage falls and further the coil current IMout3-2 is equal to 0, the H-bridge circuit 20Y shifts to the free mode. The H-bridge circuit 20Y shifts to the free mode at a time t19.

In the free mode, back electromotive force appears in a direction opposite to that of the kickback in the H-bridge circuit 20Y of the Y-phase. The CPU 101 performs commutation with the zero-cross of this back electromotive force set as a trigger, and shifts to a next fourth quadrant. The occurrence time of the kickback and the back electromotive force vary according to the drive voltage of the motor, the driving load of the motor, and the rotational speed.

The operation in the third quadrant is similar to the operation in the first quadrant except for the direction in which the current flows.

<<Fourth Quadrant: Time t22>>

At a time t22 in the fourth quadrant, the H-bridge circuit 20X of the X-phase shifts to the flyback mode. The H-bridge circuit 20Y of the Y-phase shifts to the charge mode. As shown in FIG. 6, the stepping motor 120 is in the Y− phase, and the voltage VMout2 becomes the voltage MVdd.

As shown in FIG. 5, a flyback pulse (kickback) occurring in a direction opposite to the direction of a voltage applied in an immediately preceding third quadrant occurs in the H-bridge circuit 20X of the X-phase. The H-bridge circuit 20X shifts to the free mode when the flyback voltage falls and further the coil current IMout1-0 is equal to 0. The H-bridge circuit 20X shifts to the free mode at a time t23

In the free mode, back electromotive force appears in a direction opposite to that of the kickback in the H-bridge circuit 20X of the X-phase. The CPU 101 performs commutation with the zero-cross of this back electromotive force set as a trigger, and shifts to a next third quadrant. The occurrence time of the kickback and the electromotive force voltage vary according to the drive voltage of the motor, the driving load of the motor, and the rotational speed.

In the charge mode, the voltage VMout3 is switched to GND and the voltage VMout2 is switched to the voltage MVdd in the H-bridge circuit 20Y of the Y-phase. The voltage MVdd is applied to the Y-phase stator winding 124Y in a direction opposite to that of the second quadrant, and the Y-phase coil current IMout3-2 gradually increases in a direction opposite to that in the second quadrant.

The operation in the fourth quadrant is similar to the operation in the second quadrant except for the direction in which the current flows.

<<Subsequent Quadrants>>

The H-bridge circuits 20X and 20Y perform operations similar to the operations in the first to fourth quadrants while sequentially switching the operations.

Figure 7:
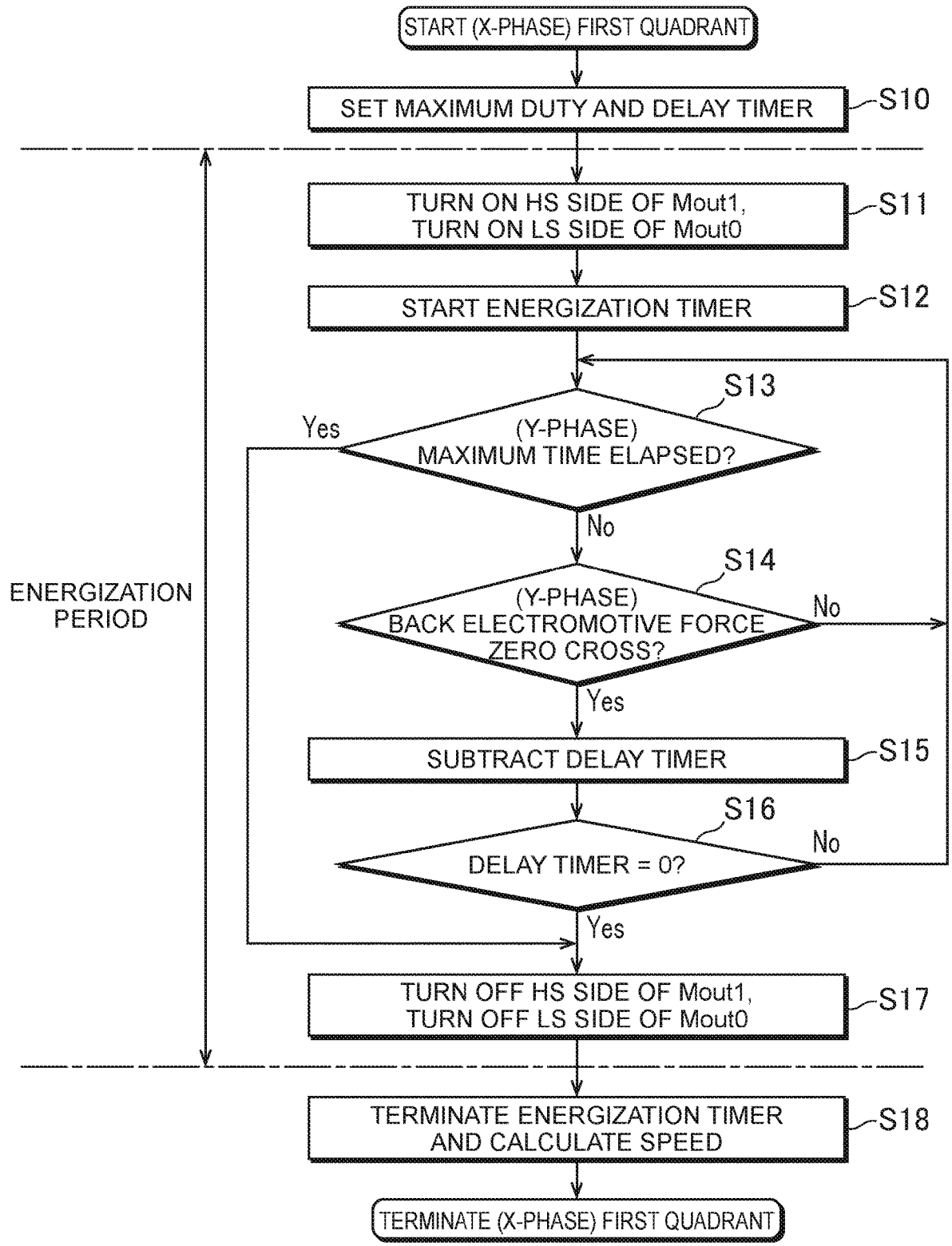
FIG. 7 is a flowchart illustrating processing of a first quadrant of the X-phase in the comparative example.

FIG. 7 is a flowchart illustrating processing of the first quadrant of the X-phase in a comparative example.

In the first quadrant, the CPU 101 sets a maximum duty for each PWM cycle and sets a value in a delay timer (processing S10), and the H-bridge circuit 20X of the X-phase shifts to an energization period. In this energization period, the H-bridge circuit 20X of the X-phase shifts to the charge mode.

The CPU 101 turns on the FET 2 on the high side (HS) of the connection point Mout1, and further turns on the FET 8 on the low side (LS) of the connection point Mout0 (processing S11). Subsequently, the CPU 101 starts an energization timer (processing S12).

The CPU 101 determines whether a maximum time associated with the Y-phase has elapsed (processing S13). When determining that the maximum time associated with the Y-phase has not elapsed (processing S13→No), the CPU 101 determines zero-cross of back electromotive force of the Y-phase (processing S14). When determining that the back electromotive force of the Y-phase does not cross zero (processing S14→No), the CPU 101 returns to the processing S13.

When determining the zero-cross of the back electromotive force of the Y-phase (processing S14→Yes), the CPU 101 subtracts the delay timer (processing S15). When determining that the delay timer is not equal to 0 (processing S16→No), the CPU 101 returns to the processing S13.

When the delay time is equal to 0 (processing S16→Yes), the CPU 101 turns off the FET 2 on the high side (HS) of the connection point Mout1 and the FET 8 on the low side (LS) of the connection point Mout0, and terminates the energization period (processing S17).

When the CPU 101 determines in processing S13 that the maximum time associated with the Y-phase has elapsed (processing S13→Yes), the CPU 101 executes the processing S17 and terminates the energization period regardless of the determination of the zero-cross of the back electromotive force of the Y-phase and the count value of the delay timer.

After the energization period is terminated, the CPU 101 terminates the energization timer, calculates the rotational speed based on the value of the energization timer (processing S18), and ends the processing in the first quadrant of the X-phase.

The processing in the second quadrant of the Y-phase is similar to the processing in the first quadrant of the X-phase. The processing in the third quadrant of the X-phase is similar to the processing in the first quadrant of the X-phase except that the direction of the voltage applied to the stator winding 124X (see FIG. 1) is different.

The processing in the fourth quadrant of the Y-phase is similar to the processing in the first quadrant of the X-phase except that the direction of the voltage applied to the stator winding 124Y (see FIG. 1) is different.

Figure 8:
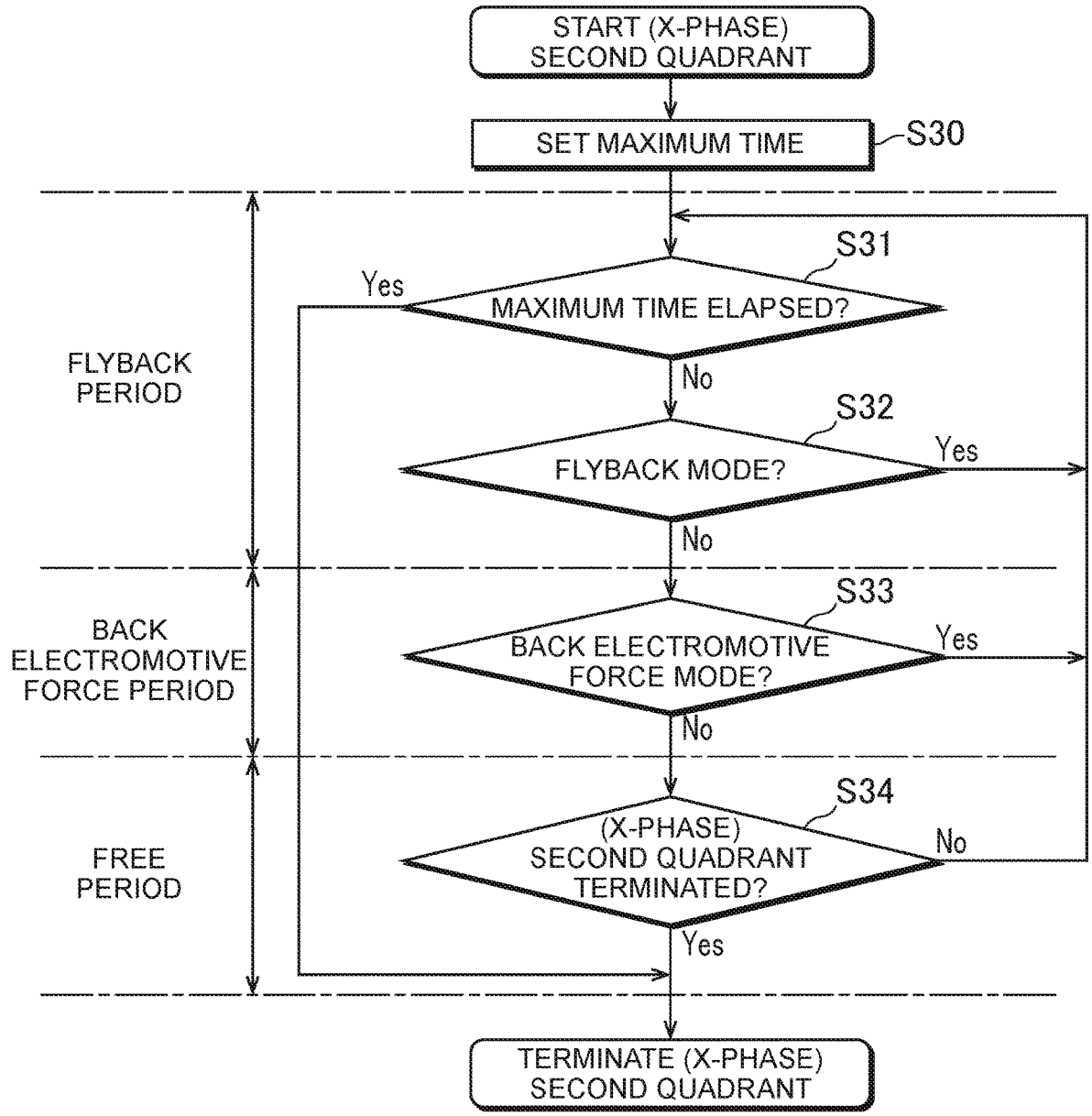
FIG. 8 is a flowchart illustrating processing of a second quadrant of the X-phase in the comparative example.

FIG. 8 is a flowchart illustrating processing of the second quadrant of the X-phase in the comparative example.

First, in the second quadrant, the CPU 101 sets a maximum time in the timer (processing S30). The H-bridge circuit 20X of the X-phase shifts to a flyback period. In the flyback period, the H-bridge circuit 20X of the X-phase shifts to the flyback mode.

In the flyback period, when the flyback mode is terminated (processing S32→No), the H-bridge circuit 20X shifts to a back electromotive force period. During the back electromotive force period, the H-bridge circuit 20X of the X-phase shifts to the back electromotive force mode. The termination of the flyback mode may be detected based on any of the following: falling of the flyback voltage, zero-cross of the flyback voltage, and zero-cross of the coil current.

Subsequently, in the back electromotive force period, when the back electromotive force mode is terminated (processing S33→No), the H-bridge circuit 20X shifts to a free period. In the free period, the H-bridge circuit 20X of the X-phase shifts to the free mode. The termination of the back electromotive force mode may be detected based on zero-cross of the back electromotive force. When the back electromotive force does not exceed 0 V due to an overload, the termination of the back electromotive force mode may be detected based on lapse of the delay time from a peak of the back electromotive force (approximately twice the time from the start of the back electromotive force mode to the peak, etc.) or a next voltage increase after the peak of the back electromotive force.

In the free period, when determining termination of the second quadrant of the X-phase (processing S34→Yes), the CPU 101 ends the processing of the second quadrant of the X-phase.

When the conditions of the processing S32 and S33 are satisfied and when the condition of the processing S34 is not satisfied, the CPU 101 returns to the processing S31 and determines excess of the maximum time. When the timer has exceeded the maximum time (processing S31→Yes), the CPU 101 ends the processing of the second quadrant of the X-phase regardless of the operation mode.

The processing of the second quadrant of the X-phase is similar to the processing of the third quadrant of the Y-phase. The processing of the fourth quadrant of the X-phase is similar to the processing of the second quadrant of the X-phase except that the direction of the zero-crossing voltage is different.

The processing of the third quadrant of the Y-phase is similar to the processing of the first quadrant of the Y-phase except that the direction of the zero-crossing voltage is different.

Figure 9:
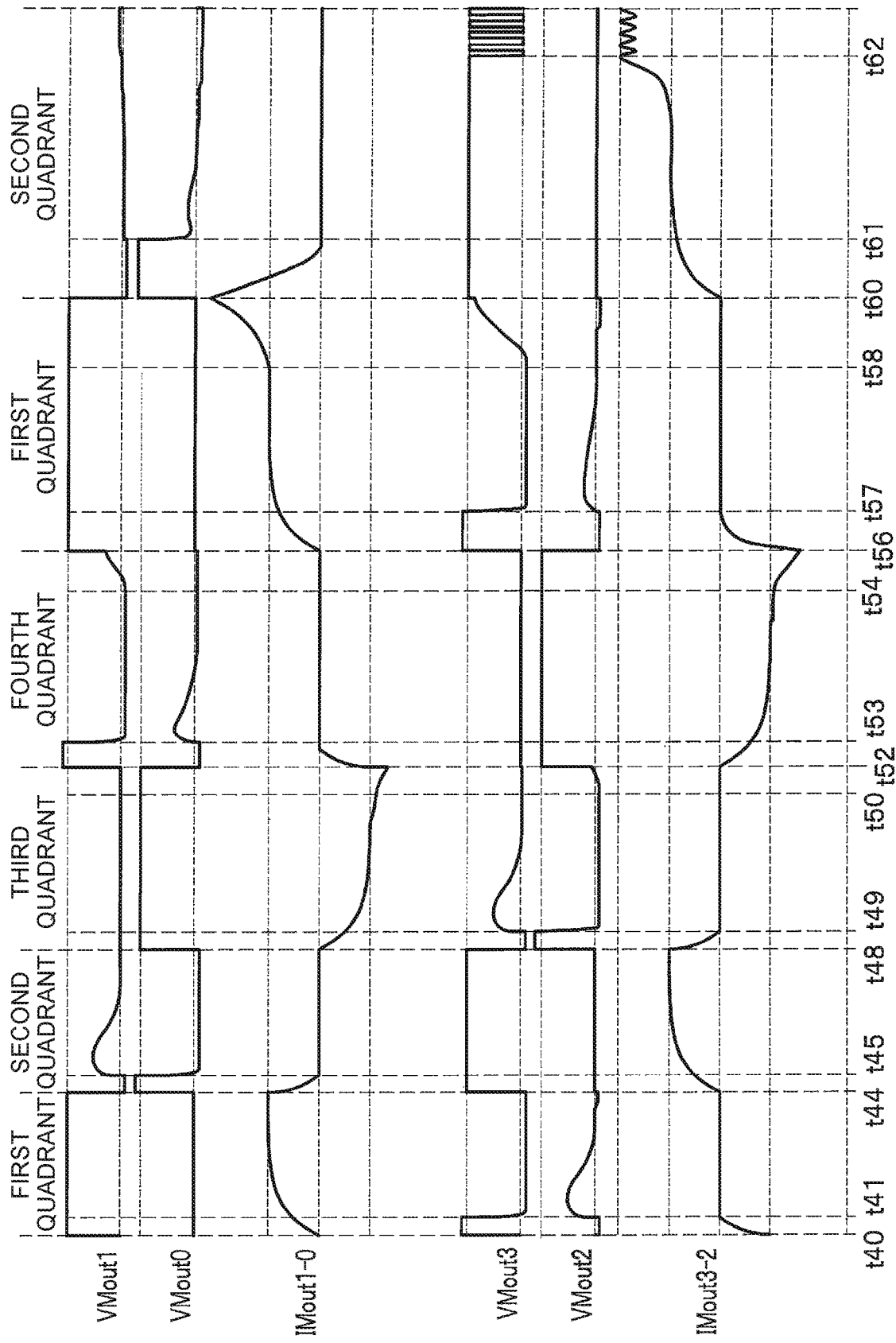
FIG. 9 is a waveform diagram illustrating currents/voltages of the X-phase and the Y-phase of the H-bridge circuit in the present embodiment.
Figure 10:
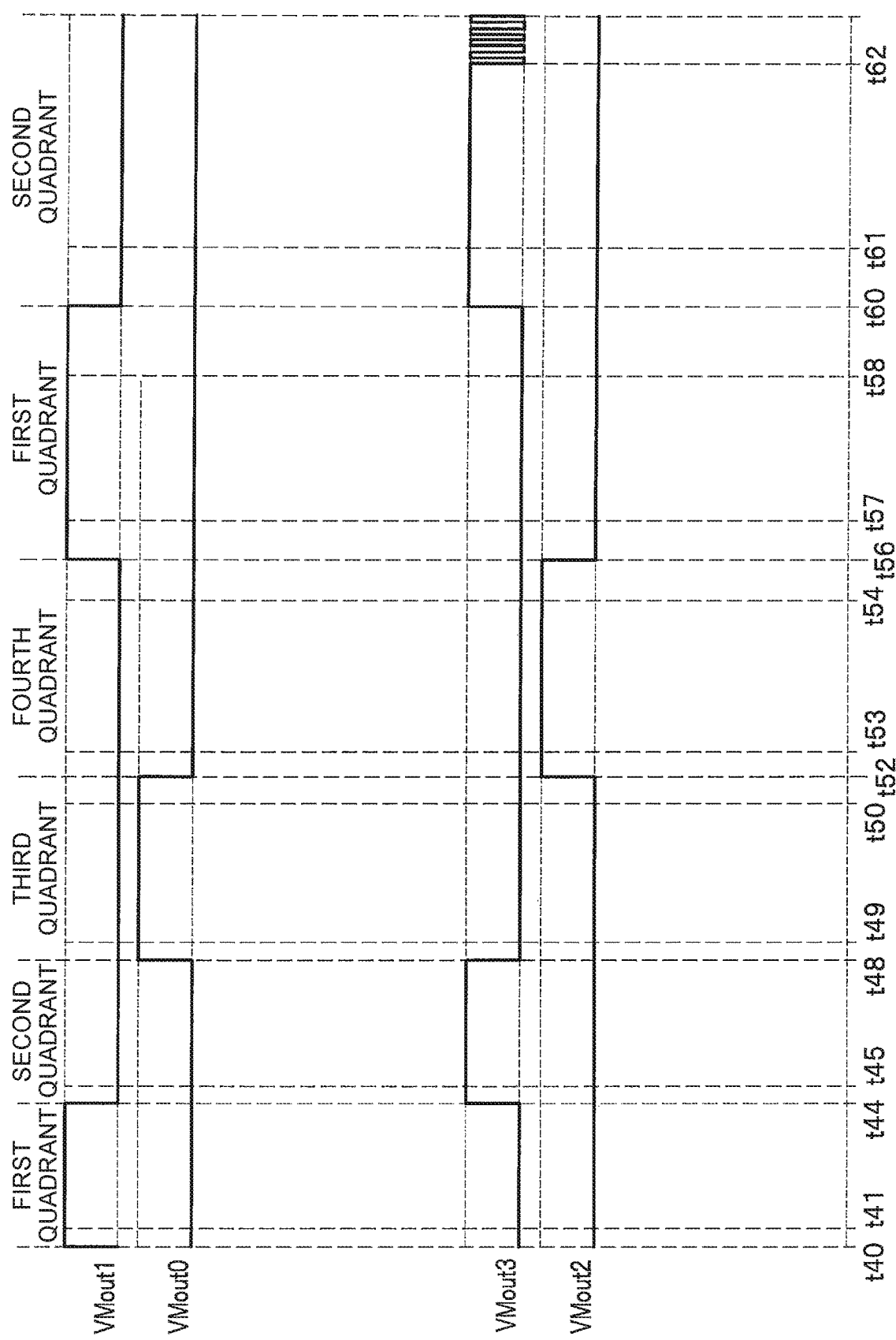
FIG. 10 is a waveform diagram illustrating a commutation order of the H-bridge circuit in the present embodiment.

FIG. 9 is a waveform diagram illustrating the currents/voltages of the X-phase and the Y-phase of the H-bridge circuit 20 in the present embodiment. FIG. 10 is a waveform diagram illustrating the commutation order of the H-bridge circuit 20 in the present embodiment. Hereinafter, the operation in each quadrant will be described with reference to FIGS. 9 and 10.

<<First Quadrant: Time t40>>

At a time t40 in the first quadrant, the H-bridge circuit 20X of the X-phase shifts to the charge mode, and the H-bridge circuit 20Y of the Y-phase shifts to the flyback mode. As shown in FIG. 10, the stepping motor 120 is in the X+ phase, and the voltage VMout1 becomes the voltage MVdd.

As shown in FIG. 9, in the charge mode, the voltage VMout1 is switched to the voltage MVdd and the voltage VMout0 is switched to GND in the H-bridge circuit 20X of the X-phase. The voltage MVdd is applied to the X-phase stator winding 124X, and the X-phase coil current IMout1-0 gradually increases.

When the absolute value of the X-phase coil current IMout1-0 exceeds a predetermined maximum current, the H-bridge circuit 20X switches from the charge mode to the slow decay mode at every PWM cycle, whereby the absolute value of the coil current IMout 1-0 is maintained at less than the maximum current.

A flyback pulse (kickback) occurring in a direction opposite to the direction of a voltage applied in an immediately preceding fourth quadrant occurs in the H-bridge circuit 20Y of the Y-phase. The H-bridge circuit 20Y shifts to the free mode when the flyback voltage falls and further the coil current IMout3-2 is equal to 0. The H-bridge circuit 20Y shifts to the free mode at a time t41.

In the free mode, back electromotive force appears in a direction opposite to that of the kickback in the H-bridge circuit 20Y of the Y-phase. The CPU 101 performs commutation with the zero-cross of this back electromotive force set as a trigger and shifts to a next second quadrant. The occurrence time of the kickback and the back electromotive force vary according to the drive voltage of the motor, the driving load of the motor, and the rotational speed.

Note that the shoot through protection mode is inserted between the respective modes as required so that the upper and lower FETs of the half bridge are not turned on at the same time. As a result, the through-current can be prevented.

<<Second Quadrant: Time t44>>

At a time t44 in the second quadrant, the H-bridge circuit 20X of the X-phase shifts to the flyback mode, and the H-bridge circuit 20Y of the Y-phase shifts to the charge mode. As shown in FIG. 10, the stepping motor 120 is in the Y+ phase, and the voltage VMout3 becomes the voltage MVdd.

As shown in FIG. 9, a flyback pulse (kickback) occurring in a direction opposite to the direction of a voltage applied in an immediately preceding first quadrant occurs in the H-bridge circuit 20X of the X-phase. The H-bridge circuit 20X shifts to the free mode when the flyback voltage falls and further the coil current IMout1-0 is equal to 0. The H-bridge circuit 20X shifts to the free mode at a time t45.

In the free mode, back electromotive force appears in a direction opposite to the direction of the kickback in the H-bridge circuit 20X of the X-phase. The CPU 101 performs commutation with the zero-cross of this back electromotive force set as a trigger, and shifts to a next third quadrant. The occurrence time of the kickback and the back electromotive force vary according to the drive voltage of the motor, the driving load of the motor, and the rotational speed.

Note that the shoot through protection mode is inserted between the respective modes as required so that the upper and lower FETs of the half bridge are not turned on at the same time. As a result, through-current can be prevented.

In the charge mode, the voltage VMout3 is switched to the voltage MVdd and the voltage VMout2 is switched to GND in the H-bridge circuit 20Y of the Y-phase. The voltage MVdd is applied to the Y-phase stator winding 124Y, and the Y-phase coil current IMout3-2 gradually increases.

When the absolute value of the Y-phase coil current IMout3-2 exceeds a predetermined maximum current, the H-bridge circuit 20Y switches from the charge mode to the slow decay mode at every PWM cycle, whereby the absolute value of the coil current IMout3-2 is maintained at less than the maximum current.

Hereinafter, deceleration stop control is being executed from a deceleration start step to a deceleration stop step. Here, the number of deceleration steps is 4. In the deceleration stop step, the stepping motor 120 reaches a final stop speed. The deceleration start step is calculated from the number of driving steps and the number of deceleration steps.

<<Third Quadrant: Time t48: Deceleration Start Step>>

At a time t48 in the third quadrant, the H-bridge circuit 20X of the X-phase shifts to the charge mode in a direction opposite to that in the first quadrant. The H-bridge circuit 20Y of the Y-phase shifts to the flyback mode in which the coil current IMout3-2 flows in a direction opposite to that in the first quadrant. The third quadrant is a step of starting deceleration of the stepping motor 120. As shown in FIG. 10, the stepping motor 120 is in the X− phase, and the voltage VMout0 becomes the voltage MVdd.

As shown in FIG. 9, in the charge mode, the voltage VMout1 is switched to GND and the voltage VMout0 is switched to the voltage MVdd in the H-bridge circuit 20X of the X-phase. A voltage is applied to the X-phase stator winding 124 X in a direction opposite to that in the first quadrant, and the X-phase coil current IMout1-0 gradually increases in a direction opposite to that in the first quadrant. The operation in the third quadrant is similar to the operation in the first quadrant except for the direction in which the current flows.

A flyback pulse (kickback) occurring in a direction opposite to the direction of a voltage applied in an immediately preceding second quadrant occurs in the H-bridge circuit 20Y of the Y-phase. The H-bridge circuit 20Y shifts to the free mode when the flyback voltage falls and further the coil current IMout3-2 is equal to 0. The H-bridge circuit 20Y shifts to the free mode at a time 49.

In the free mode, back electromotive force appears in a direction opposite to the direction of the kickback in the H-bridge circuit 20Y of the Y-phase. The occurrence time of the kickback and the back electromotive force vary according to the drive voltage of the motor, the driving load of the motor, and the rotational speed.

As will be described below, when the motor current detected by the current detection unit 116 exceeds a predetermined current value during a period from the deceleration start step to the stop, the CPU 101 specifies the slow decay mode to the H-bridge circuits 20X and 20Y at every PWM cycle.

Based on the time of an immediately preceding step measured by the timer, a predetermined maximum speed, and the number of deceleration steps, the CPU 101 calculates the time of a step of this deceleration step turn. In place of the zero-cross of the back electromotive force, the CPU 101 performs commutation with this time set as a trigger, and shifts to a next fourth quadrant.

With the deceleration, the absolute value of the coil current IMout1-0 of the X-phase may drastically increase. In this case, the H-bridge circuit 20X prevents overcurrent by shifting to the slow decay mode under current control at every PWM cycle. Here, the absolute value of the coil current IMout1-0 slightly increases after a time t50, but the H-bridge circuit 20X has not shifted to the slow decay mode.

Note that the shoot through protection mode is inserted between the respective modes as required so that the upper and lower FETs of the half bridge are not turned on at the same time. As a result, through-current can be prevented.

<<Fourth Quadrant: Time t52: Second Step of Deceleration>>

At a time t52 in the fourth quadrant, the H-bridge circuit 20X of the X-phase shifts to the flyback mode in a direction opposite to that in the second quadrant. The H-bridge circuit 20Y of the Y-phase shifts to the charge mode in a direction opposite to that in the second quadrant. This fourth quadrant is a second step of the deceleration of the stepping motor 120. As shown in FIG. 10, the stepping motor 120 is in the Y-phase, and the voltage VMout2 becomes the voltage MVdd.

As shown in FIG. 9, in the charge mode, the voltage VMout3 is switched to GND and the voltage VMout2 is switched to the voltage MVdd in the H-bridge circuit 20Y of the Y-phase. The voltage MVdd is applied to the Y-phase stator winding 124Y in a direction opposite to that in the second quadrant, and the Y-phase coil current IMout3-2 gradually increases in a direction opposite to that in the second quadrant. The operation in the fourth quadrant is similar to the operation in the second quadrant except for the direction in which the current flows.

A flyback pulse (kickback) occurring in a direction opposite to the direction of a voltage applied in an immediately preceding third quadrant occurs in the H-bridge circuit 20X of the X-phase. The H-bridge circuit 20X shifts to the free mode when the flyback voltage falls and further the coil current IMout1-0 is equal to 0. The H-bridge circuit 20X shifts to the free mode at a time t53.

In the free mode, back electromotive force appears in a direction opposite to the direction of the kickback in the H-bridge circuit 20X of the X-phase. The occurrence time of the kickback and the back electromotive force vary according to the drive voltage of the motor, the driving load of the motor and the rotational speed.

As described below, when the motor current detected by the current detection unit 116 exceeds a predetermined current value during a period from the deceleration start step to the stop, the CPU 101 specifies the slow decay mode to the H-bridge circuits 20X and 20Y at every PWM cycle.

From the time of an immediately preceding step measured by the timer, a predetermined maximum speed, and the number of deceleration steps, the CPU 101 calculates the time of a step of this deceleration step turn. In place of the zero-cross of the back electromotive force, the CPU 101 performs commutation with this time set as a trigger, and shifts to a next first quadrant.

The absolute value of the Y-phase coil current IMout3-2 may drastically increase due to deceleration. In this case, the H-bridge circuit 20Y prevents overcurrent by shifting to the slow decay mode under current control at every PWM cycle. Here, the absolute value of the coil current IMout3-2 slightly increases after a time t54, but the H-bridge circuit 20Y has not shifted to the slow decay mode.

Note that the shoot through protection mode is inserted between the respective modes as required so that the upper and lower FETs of the half bridge are not turned on at the same time. As a result, through-current can be prevented.

<<First Quadrant: Time t56: Third Step of Deceleration>>

At a time t56 in the first quadrant, the H-bridge circuit 20X of the X-phase shifts to the charge mode. The H-bridge circuit 20Y of the Y-phase shifts to the flyback mode. This first quadrant is a third step of deceleration of the stepping motor 120. As shown in FIG. 10, the stepping motor 120 is in the X+ phase, and the voltage VMout1 becomes the voltage MVdd.

As shown in FIG. 9, in the charge mode, the voltage VMout0 is switched to the voltage MVdd and the voltage VMout1 is switched to the GND in the H-bridge circuit 20X of the X-phase. The voltage MVdd is applied to the X-phase stator winding 124X, and the X-phase coil current IMout1-0 gradually increases.

A flyback pulse (kickback) occurring in a direction opposite to the direction of a voltage applied in an immediately preceding fourth quadrant occurs in the H-bridge circuit 20Y of the Y-phase. The H-bridge circuit 20Y shifts to the free mode when the flyback voltage falls and further the coil current IMout3-2 is equal to 0. The H-bridge circuit 20Y shifts to the free mode at a time t57.

In the free mode, back electromotive force appears in a direction opposite to the direction of the kickback in the H-bridge circuit 20Y of the Y-phase. The occurrence time of the kickback and the back electromotive force vary according to the drive voltage of the motor, the driving load of the motor, and the rotational speed.

The operation in the first quadrant so far is similar to the operation in the third quadrant except for the direction in which the current flows.

As described below, when the motor current detected by the current detection unit 116 exceeds a predetermined current value during the period from the deceleration start step to the stop, the CPU 101 specifies the slow decay mode to the H-bridge circuits 20X and 20Y at every PWM cycle.

From the time of an immediately preceding quadrant step measured by the timer, a predetermined maximum speed, and the number of deceleration steps, the CPU 101 calculates the time of a step of this deceleration step turn. In place of the zero-cross of the back electromotive force, the CPU 101 performs commutation with this time set as a trigger, and shifts to a next fourth quadrant.

The absolute value of the X-phase coil current IMout1-0 may drastically increase due to deceleration. In this case, the H-bridge circuit 20X prevents overcurrent by shifting to the slow decay mode under current control at every PWM cycle. Here, the absolute value of the coil current IMout1-0 slightly increases after a time t58, but the H-bridge circuit 20X has not shifted to the slow decay mode.

Note that the shoot through protection mode is inserted between the respective modes as required so that the upper and lower FETs of the half bridge are not turned on at the same time. As a result, through-current can be prevented.

<<Second Quadrant: Time t60: Deceleration Stop Step>>

At a time t60 in the second quadrant, the H-bridge circuit 20X of the X-phase shifts to the flyback mode. The H-bridge circuit 20Y of the Y-phase shifts to the charge mode. This second quadrant is a deceleration stop step of the stepping motor 120. As shown in FIG. 10, the stepping motor 120 is in the Y+ phase, and the voltage VMout3 becomes the voltage MVdd.

As shown in FIG. 9, in the charge mode, the voltage VMout3 is switched to the voltage MVdd, and the voltage VMout2 is switched to the GND in the H-bridge circuit 20Y of the Y-phase. The voltage MVdd is applied to the Y-phase stator winding 124Y, and the Y-phase coil current IMout3-2 gradually increases. The operation in the second quadrant is similar to the operation in the fourth quadrant except for the direction in which the current flows.

A flyback pulse (kickback) occurring in a direction opposite to the direction of a voltage applied in an immediately preceding third quadrant occurs in the H-bridge circuit 20X of the X-phase. The H-bridge circuit 20X shifts to the free mode when the flyback voltage falls and further the coil current IMout1-0 is equal to 0. The H-bridge circuit 20X shifts to the free mode at a time t61.

In the free mode, back electromotive force appears in a direction opposite to the direction of the kickback in the H-bridge circuit 20X of the X-phase. The occurrence time of the kickback and the back electromotive force vary according to the drive voltage of the motor, the driving load of the motor and the rotational speed.

As described below, when the motor current detected by the current detection unit 116 exceeds a predetermined current value during the period from the deceleration start step to the stop, the CPU 101 specifies the slow decay mode to the H-bridge circuits 20X and 20Y at every PWM cycle.

From the time of an immediately preceding quadrant step measured by the timer, a predetermined maximum speed, and the number of deceleration steps, the CPU 101 calculates the time of a step of this deceleration step turn. In place of the zero-cross of the back electromotive force, the CPU 101 performs commutation with this time set as a trigger, and shifts to a next third quadrant.

The absolute value of the Y-phase coil current IMout3-2 may drastically increase due to deceleration. In this case, the H-bridge circuit 20Y prevents overcurrent by shifting to the slow decay mode under current control at every PWM cycle. Here, since the absolute value of the coil current IMout3-2 increases beyond a threshold value after a time t62, the H-bridge circuit 20Y periodically shifts to the slow decay mode.

As a result, the stepping motor 120 reaches a final stop speed, and can be stopped at a desired stop position.

Note that it is also possible to decelerate by gradually decreasing ON-duty from 100% within a range where the coil current does not affect the driving of the motor and the final position holding. The ON-duty is a turn-on time of the FET at every PWM cycle. In this case, during deceleration under stop control, the commutation may be performed with the zero-cross of the back electromotive force set as a trigger. Detection of step-out can be identified based on deviation of the kickback time or back electromotive force.

Figure 11:
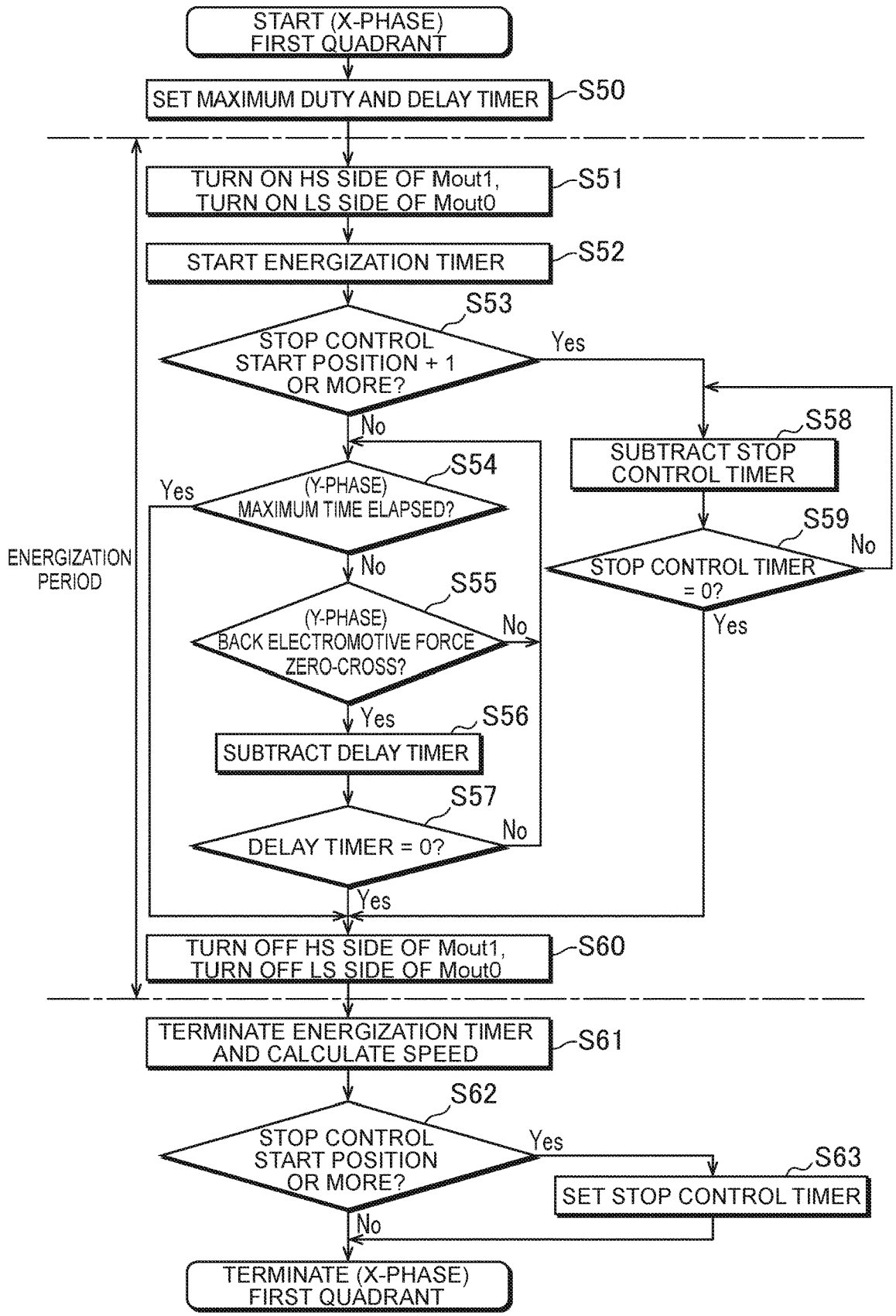
FIG. 11 is a flowchart illustrating processing of a first quadrant of the X-phase in the present embodiment.

FIG. 11 is a flowchart illustrating processing of the first quadrant of the X-phase in the present embodiment. The present embodiment is different from the comparative example shown in FIG. 7 in the processing after the stop control start position. The CPU 101 sets a stop control timer after the stop control start position, and further operates with a stop control timer instead of the zero-cross of the back electromotive force of the Y-phase after (the stop control start position+1).

In the first quadrant, the CPU 101 sets a maximum duty for each PWM cycle and sets a value in the delay timer (processing S50). The H-bridge circuit 20X of the X-phase shifts to the energization period. In this energization period, the H-bridge circuit 20X of the X-phase shifts to the charge mode.

The CPU 101 turns on the FET 2 on the high side (HS) of the connection point Mout1 and further turns on the FET 8 on the low side (LS) of the connection point Mout0 (processing S51). Subsequently, the CPU 101 starts an energization timer (processing S52).

The CPU 101 determines whether the rotational position of the motor is not less than (the stop control start position+1) (processing S53). When the rotational position is not less than (the stop control start position+1) (processing S53→Yes), the CPU 101 starts the stop control. The CPU 101 subtracts the stop control timer (processing S58), repeats the processing S59 and the processing S58 until the timer value is equal to 0, and then proceeds to processing S60.

When the rotational position of the motor is less than (the stop control start position+1) (processing S53→No), the CPU 101 proceeds to processing S54 and performs normal first quadrant processing.

In processing S54, the CPU 101 determines whether the maximum time associated with the Y-phase has elapsed. When determining that the maximum time associated with the Y-phase has not elapsed (processing S54→No), the CPU 101 determines zero-cross of back electromotive force of the Y-phase (processing S55). When determining that the back electromotive force of the Y-phase has not crossed zero (processing S55→No), the CPU 101 returns to the processing S54.

When determining the zero-cross of the back electromotive force of the Y-phase (processing S55→Yes), the CPU 101 subtracts the delay timer (processing S56). When determining that the delay timer is not equal to 0 (processing S57→No), the CPU 101 returns to the processing S54.

When the energization timer is equal to 0 (processing S57→Yes), the CPU 101 proceeds to processing S60, turns off the FET 2 on the high side (HS) of the connection point Mout1 and the FET 8 on the low side (LS) of the connection point Mout0, and terminates the energization period.

When determining in processing S54 that the maximum time associated with the Y-phase has elapsed (processing S54→Yes), the CPU 101 executes the processing S60 and terminates the energization period irrespective of the determination as to the zero-cross of the back electromotive force of the Y-phase and the count value of the delay timer.

After the termination of the energization period, the CPU 101 terminates the energization timer and calculates the rotational speed based on the value of the energization timer (processing S61). Furthermore, in the case of the stop control start position or more (processing S62→Yes), the CPU 101 sets the stop control timer (processing S63). Then, the CPU 101 ends the processing in the first quadrant of the X-phase.

The processing of the second quadrant of the X-phase by the motor driving control device according to the present embodiment is similar to the processing of the comparative example shown in FIG. 8

Figure 12:
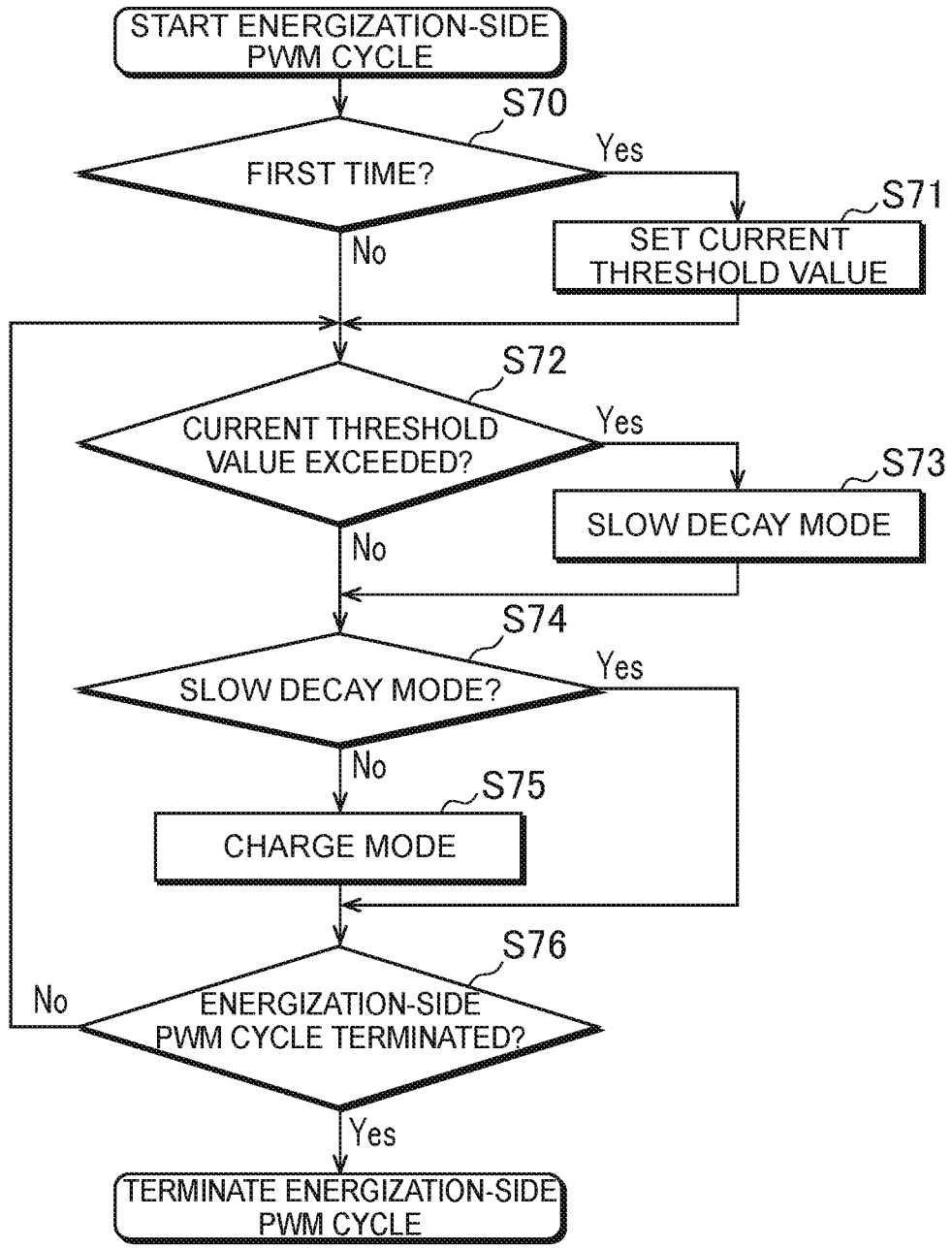
FIG. 12 is a flowchart illustrating processing of a PWM cycle on an energization side in the present embodiment.

FIG. 12 is a flowchart illustrating the processing of an energization-side PWM cycle in the present embodiment.

Here, "energization" includes one or more "energization-side PWM cycles" executed at every PWM cycle. The processing of the energization-side PWM cycle is always necessary to perform maximum current limitation under stop control including normal control. In the 1-phase excitation driving, a method using no PWM cycle is general.

When the energization-side PWM cycle is started and it is an initial cycle of the PWM cycle in this quadrant (processing S70→Yes), the CPU 101 sets a threshold value for the coil current (processing S71) and proceeds to processing S72. When the energization-side PWM cycle is not the initial cycle of the PWM cycle in this quadrant (processing S70→No), the CPU 101 proceeds to processing S72.

When the coil current exceeds the threshold value (processing S72→Yes), the CPU 101 causes the H-bridge circuit 20 to shift to the slow decay mode (processing S73) and proceeds to processing S74.

When the coil current does not exceed the threshold value (processing S72→No), the CPU 101 proceeds to processing S74. When the H-bridge circuit 20 is not in the slow decay mode (processing S74→No), the CPU 101 shifts to the charge mode (processing S75), and when the H-bridge circuit 20 is in the slow decay mode (processing S74→Yes), the CPU 101 determines whether the energization-side PWM cycle terminates (processing S76).

The CPU 101 repeats these processes S72 to S75 until the energization-side PWM cycle terminates (processing S76→No).

Figure 13:
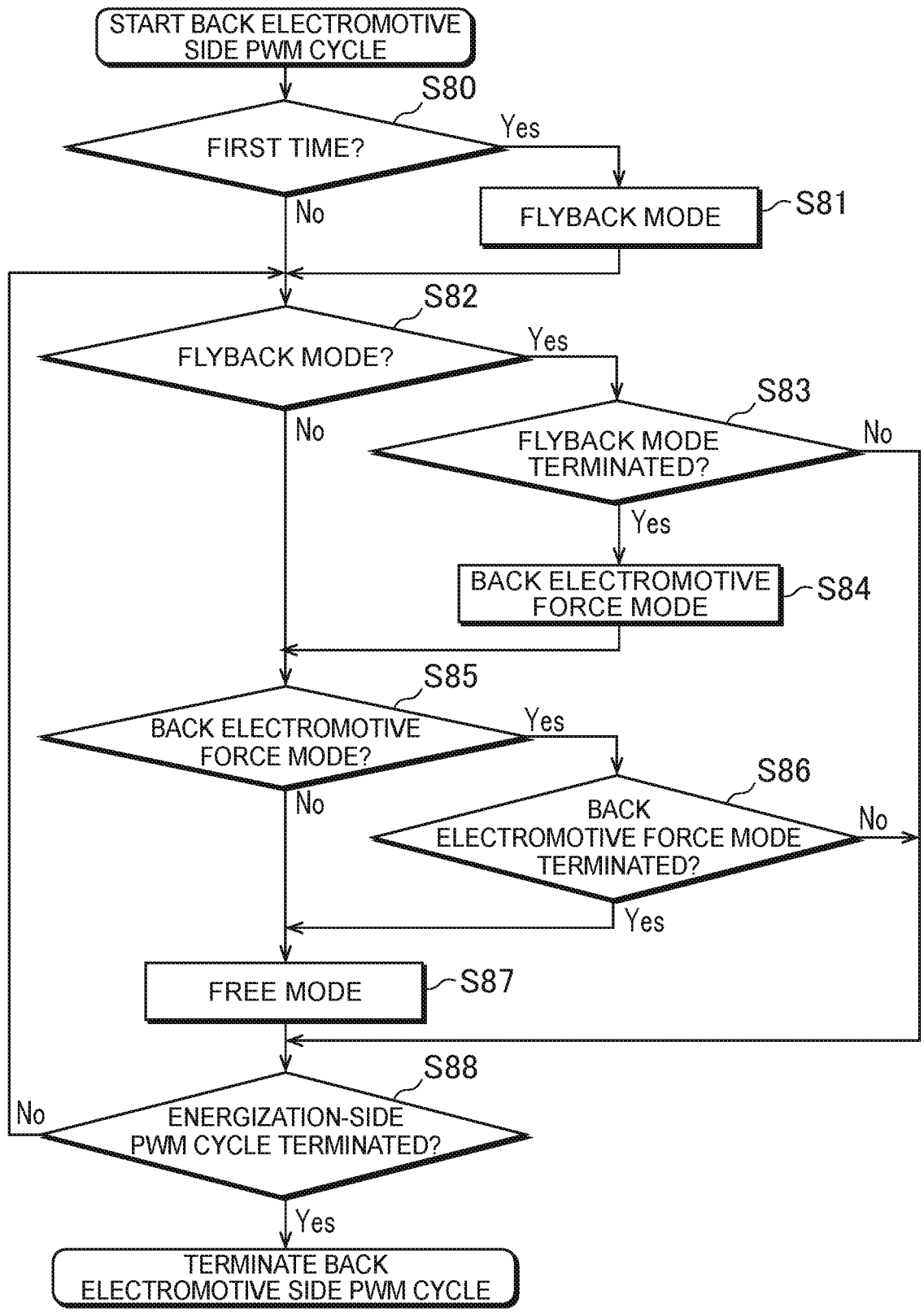
FIG. 13 is a flowchart illustrating processing of a PWM cycle on a back electromotive (non-energization) side in the present embodiment.

FIG. 13 is a flowchart illustrating the processing of the PWM cycle on a back electromotive side in the present embodiment. The back electromotive side is a non-energization side of the PWM cycle, and the processing of the PWM cycle on this side is executed at every PWM cycle.

When the back electromotive side PWM cycle is started and it is an initial cycle of the PWM cycle in this quadrant (processing S80→Yes), the CPU 101 causes the H-bridge circuit 20 to shift to the flyback mode (processing S81), and proceeds to processing of S82. When the back electromotive side PWM cycle is not the initial cycle of the PWM cycle in this quadrant (processing S80→No), the CPU 101 proceeds to processing S82.

Thereafter, when the H-bridge circuit 20 is in the flyback mode (processing S82→Yes) and this flyback mode has terminated (processing S83→Yes), the H-bridge circuit 20 shifts to the back electromotive force mode (processing S84), and then proceeds to processing S85. When the H-bridge circuit 20 is not in the flyback mode (processing S82→Yes), the H-bridge circuit 20 proceeds to processing S85. When the H-bridge circuit 20 is in the flyback mode (processing S82→Yes) and this flyback mode continues (processing S83→No), the H-bridge circuit 20 proceeds to processing S88.

In processing S85, when the H-bridge circuit 20 is not in the back electromotive force mode (processing S85→No) or when the back electromotive force mode has terminated (processing S86→Yes), the H-bridge circuit 20 shifts to the free mode (processing S87), and proceeds to processing S88. When the H-bridge circuit 20 is in the back electromotive force mode (processing S85→Yes) and the back electromotive force mode continues (processing S86→No), the H-bridge circuit 20 proceeds to processing S88.

The CPU 101 and the H-bridge circuit 20 repeat these processes S82 to S87 until the energization-side PWM cycle has terminated (processing S88→No).

<<Various Deceleration Control Methods>>

In the motor driving control device 100 according to the present embodiment, when stopping the driving of the stepping motor 120, the CPU 101 performs extension control of a commutation time for each step from the calculated deceleration start step until the rotational speed of the stepping motor 120 decreases to a predetermined rotational speed or less at which the stepping motor 120 can stop at a desired stop position. More specifically, when stopping the driving of the stepping motor 120, the CPU 101 performs deceleration control in which a phase switching (commutation) time is increased according to the following deceleration step until the rotational speed reaches a speed capable of securing positional accuracy of the rotational stop position of the stepping motor 120, so that the positional accuracy can be secured with few steps.

<<Deceleration Control Method Based on Increase of Time>>

The CPU 101 ceases the commutation based on the zero-cross of the back electromotive force until the stepping motor 120 reaches a predetermined rotational speed or less from the deceleration start step, and extends the commutation time for each step. More specifically, the CPU 101 measures the time of 1-phase excitation just before deceleration, and performs time control by gradually extending the phase switching (commutation) time, thereby decelerating the rotational speed of the motor. This deceleration method can secure the positional accuracy by adjusting the number of deceleration steps and a time increasing rate. It may be considered to be increase of time, for example, to increase the commutation time for each step at a constant rate (e.g., the time is extended by 25% in each step). This is represented in the following expression (1).

[Expression 1]

$$T_{next}(1+K_{extend}) \times T_{now} \quad (1)$$

Where, $T_{next}$: phase switching time in next step
$T_{now}$: phase switching time in current step
$K_{extend}$: time increasing coefficient between steps (for example, 25% or the like)

As a result, the time in each step is multiplied by 1.25→1.56→1.95→2.44, and the average speed is equal to 80%→64%→51.2%→41.0%. According to this deceleration method, the rotational speed can be steeply reduced immediately after the start of deceleration with few steps, and the rotational speed can be gradually reduced immediately before the termination of deceleration.

<<Deceleration Control Method Based on Specification of Final Speed+Constant Speed Decrease>>

The time of 1-phase excitation just before the deceleration start step is measured, and the speed is calculated by the expression (2).

[Expression 2]

$$V_{first}=1/T_{prev} \quad (2)$$

Where, $V_{first}$: speed just before deceleration start step
$T_{prev}$: time of 1-phase excitation just before deceleration start step Furthermore, the number of deceleration steps and the final step time are specified, and calculation is performed according to the expression (3) so that the decrease in the average speed between steps is constant.

[Expression 3]

$$V_{tick}=(V_{first}-1/T_{final})/D_{steps} \quad (3)$$

Where, $V_{tick}$: decrease of speed between steps
$D_{steps}$: the number of deceleration steps
$V_{first}$: speed at deceleration start time
$T_{final}$: final step time The speed in each step can be calculated by substituting this speed decrease into the expression (4).

[Expression 4]

$$V_{next}=V_{now}-V_{tick} \quad (4)$$

Where, $V_{next}$: speed in next step
$V_{now}$: speed in current step
$V_{tick}$: speed decrease between steps According to this deceleration method, it is possible to perform settings for efficiently preventing overrun by specifying the rotational speed mainly contributing to kinetic energy.

<<Deceleration Control Method Based on Specification of Final Speed+Constant Time Increase>>

Figure 14:
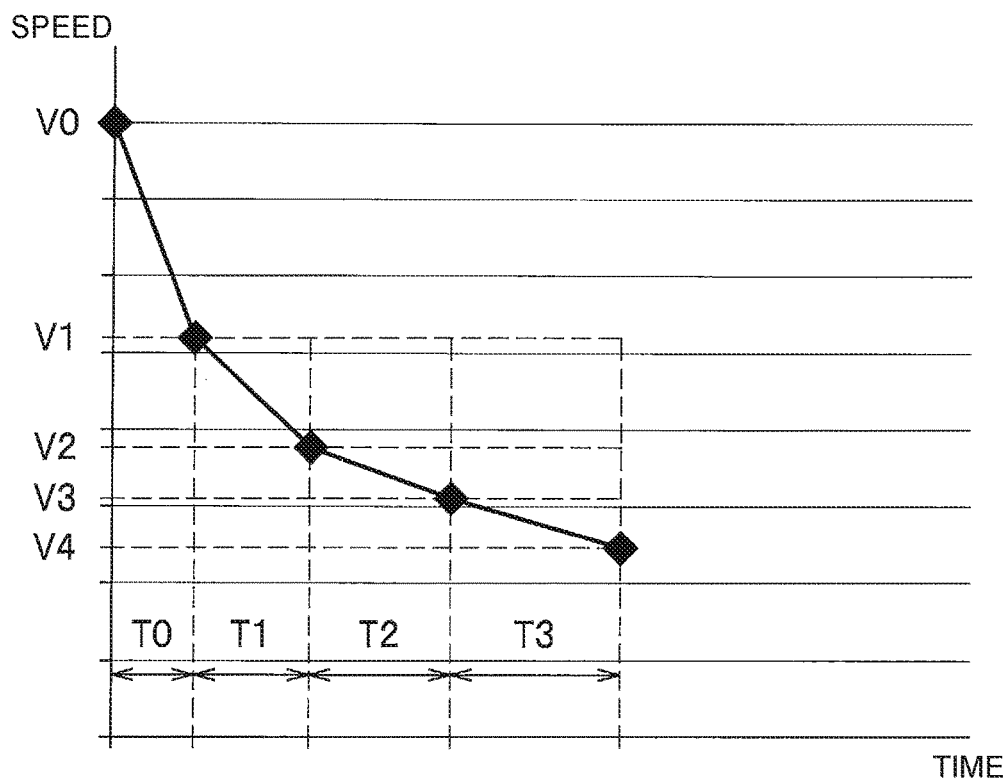
FIG. 14 is a graph illustrating a first deceleration example in the present embodiment.

This is a method of specifying the number of deceleration steps and the time of a final step so that the time increasing rate of each step is constant. The relationship between the rotational speed and the time according to this deceleration control method is shown in FIG. 14.

This deceleration control method has a characteristic such that decrease in average speed immediately after deceleration starts is substantial and decrease in average speed decrease immediately before deceleration terminates is slight.

<<Deceleration Control Method Based on Specification of Final Speed+Constant Deceleration>>

Figure 15:
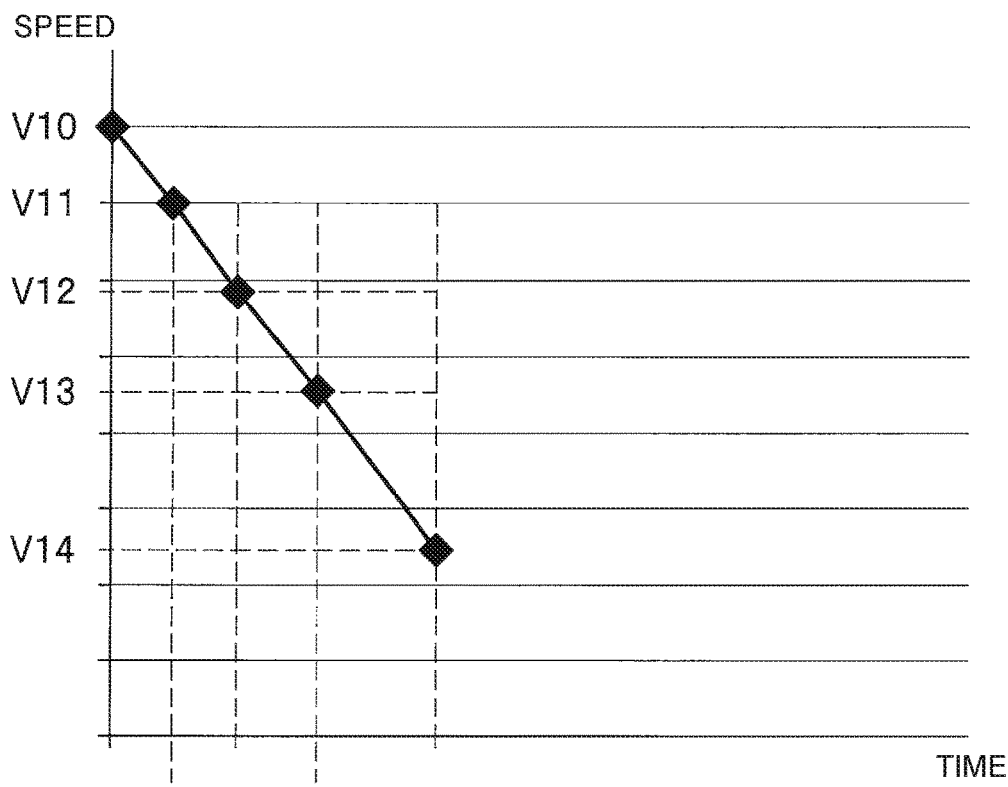
FIG. 15 is a graph illustrating a second deceleration example in the present embodiment.

This is a method of specifying the number of deceleration steps and the rotational speed of a final step so that the deceleration is constant. At this time, the rotational speed is represented by a linear function of time. The relationship between the rotational speed and the time according to this deceleration control method is shown in FIG. 15.

<<Deceleration Control Method Based on Specification of Final Speed+Speed Table>>

The commutation time is specified from a speed calculated from a deceleration obtained by measuring the time of 1-phase energization just before the deceleration start step, specifying the deceleration step number and the final step time, and performing ratio calculation based on a speed table (trapezoid/S-shape, presence or absence of a linear part), and deceleration is performed. According to this deceleration method, the speeds immediately after the deceleration starts and immediately before the deceleration terminates become gradual, and the influence on the load becomes slightest.

In addition to the deceleration control method described above, the motor rotational speed may be reduced by simultaneously using duty control to intentionally gradually reduce the duty per PWM cycle of 1-phase energization. For example, the duty is reduced by 10% each time, so that the duty is reduced to 90%→80%→70%→60%. In this case, when the commutation is performed with the zero-cross of the back electromotive force set as a trigger, for example, in a case where the load increases due to the rotation of the motor, the current required for lifting the load may be insufficient, and therefore time control of gradually extending the phase switching (commutation) time may be used in combination. The effect of this duty control on the deceleration of the speed is different depending on the motor and voltage/load.

Effect of the Present Embodiment (1) By performing the extension control of the commutation time for each step or the extension control of the zero cross interval between the steps, it is possible to enhance the positional accuracy of the rotational stop position of the motor when the motor driven under 1-phase energization and without a position sensor is stopped with respect to a varying voltage or a load varying due to rotation of the motor.

(2) According to the deceleration control method of the present embodiment, it is possible to stop the motor at a desired stop position without overrunning the rotational stop position of the motor.

(3) According to the deceleration control method of the present embodiment, it is possible to accurately control the rotational stop position of the motor with a low number of steps and in a short time irrespective of the drive voltage or the load.

(4) When the coil current exceeds the threshold value, the CPU 101 specifies the slow decay mode at the PWM cycle. As a result, the decay of the coil current can be suppressed, and the driving force and the holding force can be maintained. In addition, generation of electromagnetic noise can be suppressed.

(5) When the coil current exceeds the threshold value, the CPU 101 performs control so as to repeat the charge mode and the slow decay mode. This reduces the current ripple.

Variant

The present disclosure is not limited to the above embodiment, and may be modified and implemented without departing from the subject matter of the present disclosure. For example, the following matters (a) to (c) may be adopted.

(a) The type of the motor is not limited to the stepping motor, but includes a brushless DC motor.

(b) It is also possible to perform deceleration by gradually reducing the on-duty from 100% within a range where the coil current does not affect the driving of the motor and the final position holding. Note that the on-duty means the time an FET at each PWM cycle is turned on.

(c) the CPU 101 may perform the extension control of the commutation time for each step by setting a stop control value in an energization timer without the stop control timer.

What is claimed is:

1. A motor driving control device comprising:
   a zero-cross detection unit configured to detect zero-cross of back electromotive force of a motor coil provided in a motor; and
   a control unit configured to:
   control driving of the motor by a 1-phase energization method by position sensorless driving,
   perform commutation based on the zero-cross of the back electromotive force detected by the zero-cross detection unit,
   control driving of the motor based on a rotational speed corresponding to a drive voltage and a load of the motor, and
   perform extension control of a commutation time for each step of the motor from a calculated motor deceleration start step until the rotational speed of the motor decreases to a predetermined rotational speed or less, such that the motor is configured to stop at a desired stop position when the driving of the motor is stopped.

2. The motor driving control device according to claim 1, wherein the control unit performs control of ceasing the commutation based on the zero-cross of the back electromotive force from the deceleration start step until the motor is equal to or lower than the predetermined rotational speed to extend the commutation time for each step.

3. The motor driving control device according to claim 2, wherein the control unit increases the commutation time for each step at a constant rate.

4. The motor driving control device according to claim 1, wherein the deceleration start step is calculated based on a number of driving steps and a number of deceleration steps.

5. The motor driving control device according to claim 1, further comprising an H-bridge circuit combining half bridges connected to the motor coil, and a current detection unit configured to detect a motor current flowing through the motor coil, wherein the control unit specifies a slow decay mode to the H-bridge circuit at every PWM cycle when the motor current detected by the current detection unit exceeds a predetermined current value during a period from the deceleration start step until the motor is stopped.

6. The motor driving control device according to claim 5, wherein the control unit repeats a charge mode and the slow decay mode as an operation mode under current limitation.

7. The motor driving control device according to claim 6, wherein the control unit performs transition in order of a shoot through protection mode, a flyback mode, and a free mode after repetition of the charge mode and the slow decay mode at every PWM cycle as the operation mode under current limitation.

8. A motor driving control method comprising:
- detecting zero-cross of back electromotive force of a motor coil provided in a motor; and
- controlling driving of the motor by a 1-phase energization method, by position sensorless driving;
- performing commutation based on the detected zero-cross of the back electromotive force;
- controlling driving of the motor based on a rotational speed corresponding to a drive voltage and a load of the motor; and
- performing extension control of a commutation time for each step of the motor from a calculated motor deceleration start step until the rotational speed of the motor decreases to a predetermined rotational speed or less, such that the motor is configured to stop at a desired stop position when the driving of the motor is stopped.

* * * * *